(12) United States Patent
Broyde et al.

(10) Patent No.: US 9,698,484 B1
(45) Date of Patent: Jul. 4, 2017

(54) METHOD FOR AUTOMATICALLY ADJUSTING TUNABLE PASSIVE ANTENNAS, AND AUTOMATICALLY TUNABLE ANTENNA ARRAY USING THIS METHOD

(71) Applicant: TEKCEM, Maule (FR)

(72) Inventors: Frédéric Broyde, Maule (FR); Evelyne Clavelier, Maule (FR)

(73) Assignee: Tekcem (FR)

( * ) Notice: Subject to any disclaimer, the term of this patent is extended or adjusted under 35 U.S.C. 154(b) by 0 days.

(21) Appl. No.: 15/342,663

(22) Filed: Nov. 3, 2016

Related U.S. Application Data

(63) Continuation of application No. 15/337,595, filed on Oct. 28, 2016, now abandoned, which is a
(Continued)

(51) Int. Cl.
*H01Q 21/00* (2006.01)
*H01Q 9/04* (2006.01)

(52) U.S. Cl.
CPC .......... *H01Q 9/0442* (2013.01); *H01Q 21/00* (2013.01); *H01Q 21/0006* (2013.01)

(58) Field of Classification Search
CPC ... H01Q 9/0442; H01Q 21/00; H01Q 21/0006
See application file for complete search history.

(56) References Cited

U.S. PATENT DOCUMENTS

| | | |
|---|---|---|
| 8,063,839 B2 | 11/2011 | Ansari et al. |
| 8,102,830 B2 | 1/2012 | Yokoi et al. |

(Continued)

FOREIGN PATENT DOCUMENTS

| | | |
|---|---|---|
| FR | 2996067 A1 | 3/2014 |
| FR | 3004604 A1 | 10/2014 |

(Continued)

OTHER PUBLICATIONS

Broyde et al, "Some Properties of Multiple-Antenna-Port and Multiple-User-Port Antenna Tuners", IEEE Trans. on circuits and Systems—I: Regular Papers, vol. 62, No. 2, pp. 423-432, Feb. 2015.
(Continued)

*Primary Examiner* — Jessica Han
*Assistant Examiner* — Michael Bouizza
(74) *Attorney, Agent, or Firm* — Barnes & Thornburg LLP

(57) ABSTRACT

The invention relates to a method for automatically adjusting a plurality of tunable passive antennas, for instance a plurality of tunable passive antennas of a radio transceiver using several antennas simultaneously. The invention also relates to an automatically tunable antenna array using this method. An automatically tunable antenna array of the invention has 4 user ports, and comprises: 4 tunable passive antennas, the 4 tunable passive antennas operating simultaneously in a given frequency band and forming a multiport antenna array; 4 sensing units; 4 feeders; a signal processing unit delivering a tuning instruction; and a tuning control unit, the tuning control unit receiving the tuning instruction from the signal processing unit, the tuning control unit delivering tuning control signals to the tunable passive antennas, the tuning control signals being determined as a function of the tuning instruction.

19 Claims, 10 Drawing Sheets

Related U.S. Application Data continuation of application No. PCT/IB2016/051400, filed on Mar. 11, 2016.

(56) References Cited

U.S. PATENT DOCUMENTS

| | | | |
|---|---|---|---|
| 8,325,097 B2 | 12/2012 | McKinzie, III et al. | |
| 2003/0219035 A1* | 11/2003 | Schmidt | H01Q 9/0442 370/478 |
| 2014/0159971 A1* | 6/2014 | Hall | H01Q 21/0006 343/745 |
| 2015/0078485 A1 | 3/2015 | Broyde et al. | |

FOREIGN PATENT DOCUMENTS

| | | |
|---|---|---|
| FR | 3018637 A1 | 9/2015 |
| FR | 3018973 A1 | 9/2015 |
| FR | 3021813 A1 | 12/2015 |
| WO | WO 2014/049475 A2 | 4/2014 |
| WO | WO 2014/170766 A1 | 10/2014 |
| WO | WO2015/136409 A1 | 9/2015 |
| WO | WO2015/140660 A1 | 9/2015 |
| WO | WO2015/181653 A1 | 12/2015 |

OTHER PUBLICATIONS

Broyde et al, "A New Multiple-Antenna-Port and Multiple-User-Port Antenna Tuner", proceedings of the 2015 IEEE Radio & Wireless Week, RWW 2015, Jan. 2015.

Broyde et al, "Two Multiple-Antenna-Port and Multiple-User-Port Antenna Tuners", proceedings of the 9th European Conference on Antenna and Propagation, EuCAP 2015, Apr. 2015.

Search report for International Application No. PCT/IB2016/051400.

Written opinion for International Application No. PCT/IB2016/051400.

Search strategy for International Application No. PCT/IB2016/051400.

Petosa, "An Overview of Tuning Techniques for Frequency-Agile Antennas", IEEE Antennas and Propagation Magazine, vol. 54, No. 5, pp. 271-296, Oct. 2012.

Krewski et al, "Electrically Tunable Mode Decomposition Network for 2-port MIMO Antennas", Proc. of the 2013 Loughborough Antennas and Propagation Conference (LAPC), pp. 553-558, Nov. 11-12, 2013 (See Section IV).

* cited by examiner

METHOD FOR AUTOMATICALLY ADJUSTING TUNABLE PASSIVE ANTENNAS, AND AUTOMATICALLY TUNABLE ANTENNA ARRAY USING THIS METHOD

CROSS REFERENCE TO RELATED APPLICATIONS

This application is a continuation application of U.S. application Ser. No. 15/337,595, filed Oct. 28, 2016, which is a Continuation Application of PCT application No. PCT/IB2016/051400, filed 11 Mar. 2016, entitled "Method for automatically adjusting tunable passive antennas, and automatically tunable antenna array using this method", which in turn claims priority to French patent application No. 15/02633 of 17 Dec. 2015, entitled "Procédé pour régler automatiquement des antennes passives accordables et réseau d'antennes automatiquement accordable utilisant ce procédé", all of which are incorporated herein by reference.

FIELD OF THE INVENTION

The invention relates to a method for automatically adjusting a plurality of tunable passive antennas, for instance a plurality of tunable passive antennas of a radio transceiver using several antennas simultaneously. The invention also relates to an automatically tunable antenna array using this method.

PRIOR ART

A tunable passive antenna comprises at least one antenna control device having at least one parameter having an effect on one or more characteristics of said tunable passive antenna, said at least one parameter being adjustable, for instance by electrical means. Adjusting a tunable passive antenna means adjusting at least one said at least one parameter. Each of said one or more characteristics may for instance be an electrical characteristic such as an impedance at a specified frequency, or an electromagnetic characteristic such as a directivity pattern at a specified frequency. A tunable passive antenna may also be referred to as "reconfigurable antenna". Some authors consider three classes of tunable passive antennas: polarization-agile antennas, pattern-reconfigurable antennas and frequency-agile antennas. The state of the art regarding frequency-agile antennas is for instance described in the article of A. Petosa entitled "An Overview of Tuning Techniques for Frequency-Agile Antennas", published in *IEEE Antennas and Propagation Magazine*, vol. 54, No. 5, in October 2012. As explained in this article, many different types of antenna control device may be used to control one or more characteristics of a tunable passive antenna. An antenna control device may for instance be:

an electrically controlled switch or change-over switch, in which case a parameter of the antenna control device having an effect on one or more characteristics of the tunable passive antenna may be the state of the switch or change-over switch;

an adjustable impedance device, in which case a parameter of the antenna control device having an effect on one or more characteristics of the tunable passive antenna may be the reactance or the impedance of the adjustable impedance device at a specified frequency; or an actuator arranged to produce a mechanical deformation of the tunable passive antenna, in which case a parameter of the antenna control device having an effect on one or more characteristics of the tunable passive antenna may be a length of the deformation.

If an antenna control device is an electrically controlled switch or change-over switch, it may for instance be an electro-mechanical relay, or a microelectromechanical switch (MEMS switch), or a circuit using one or more PIN diodes or one or more insulated-gate field-effect transistors (MOSFETs) as switching devices.

An adjustable impedance device is a component comprising two terminals which substantially behave as the terminals of a passive linear two-terminal circuit element, and which are consequently fully characterized by an impedance which may depend on frequency, this impedance being adjustable.

An adjustable impedance device having a reactance which is adjustable by electrical means may be such that it only provides, at a given frequency, a finite set of reactance values, this characteristic being for instance obtained if the adjustable impedance device is:

a network comprising a plurality of capacitors or open-circuited stubs and one or more electrically controlled switches or change-over switches, such as electro-mechanical relays, or microelectromechanical switches, or PIN diodes or insulated-gate field-effect transistors, used to cause different capacitors or open-circuited stubs of the network to contribute to the reactance; or a network comprising a plurality of coils or short-circuited stubs and one or more electrically controlled switches or change-over switches used to cause different coils or short-circuited stubs of the network to contribute to the reactance.

An adjustable impedance device having a reactance which is adjustable by electrical means may be such that it provides, at a given frequency, a continuous set of reactance values, this characteristic being for instance obtained if the adjustable impedance device is based on the use of a variable capacitance diode; or a MOS varactor; or a microelectromechanical varactor (MEMS varactor); or a ferroelectric varactor.

Many methods exist for automatically adjusting a single tunable passive antenna, for instance the methods disclosed in the patent of the U.S. Pat. No. 8,063,839 entitled "Tunable antenna system", and in the patent of the U.S. Pat. No. 8,325,097 entitled "Adaptively tunable antennas and method of operation therefore". Such methods cannot be used for automatically adjusting a plurality of tunable passive antennas, when the interactions between the tunable passive antennas are not negligible.

A method for automatically adjusting a plurality of tunable passive antennas is disclosed in the patent of the U.S. Pat. No. 8,102,830 entitled "MIMO Radio Communication Apparatus and Method", in which each tunable passive antenna comprises a main antenna which is connected to the signal port of said each tunable passive antenna, and two or more auxiliary antennas. Each of the auxiliary antennas is connected to an adjustable impedance device, each of the adjustable impedance devices having a reactance which is adjustable by electrical means. Each of the tunable passive antennas may be regarded as a pattern-reconfigurable antenna. This method is only applicable to a radio receiver using a plurality of antennas simultaneously for MIMO radio reception.

A method for automatically adjusting a plurality of tunable passive antennas is disclosed in the French patent application No. 14/00666 of 20 Mar. 2014, which corresponds to the PCT application No. PCT/IB2015/051644 of 6 Mar. 2015 (WO 2015/140660). In this method, a tuning instruction has an effect on each parameter of a plurality of tunable passive antennas. This method is applicable to a radio receiver using a plurality of antennas simultaneously and to a radio transmitter using a plurality of antennas simultaneously. This method may be used when the interactions between the tunable passive antennas are not negligible. In particular, the ninth embodiment of the French patent application No. 14/00666 and of the PCT application No. PCT/IB2015/051644 discloses a particular implementation of this method, which is applicable to a radio transmitter connected to m radio ports of an antenna tuning apparatus coupled to the tunable passive antennas, where m is an integer greater than or equal to 2. In this implementation, the tuning instruction is a function of q real quantities depending on an impedance matrix presented by the radio ports, where q is an integer greater than or equal to m, these q real quantities being estimated using m or more different excitations applied successively to the radio ports. Unfortunately, this technique is usually not compatible with the specification of a radio transmitter used for MIMO wireless communication, because the generation of a sequence of m or more different excitations entails an emission of electromagnetic waves, which is usually not compatible with the requirements of all MIMO emission modes of applicable standards, for instance the LTE-Advanced standards.

Consequently, there is no known solution to the problem of automatically adjusting the plurality of tunable passive antennas coupled to a radio transmitter used for MIMO wireless communication, in a manner that complies with standards typically applicable to MIMO wireless networks.

SUMMARY OF THE INVENTION

The purpose of the invention is a method for automatically adjusting a plurality of tunable passive antennas, without the above-mentioned limitations of known techniques, and also an automatically tunable antenna array using this method.

In what follows, "having an influence" and "having an effect" have the same meaning.

The method of the invention is a method for automatically adjusting n tunable passive antennas, where n is an integer greater than or equal to 2, each of the n tunable passive antennas comprising at least one antenna control device, one or more characteristics of said each of the n tunable passive antennas being controlled using said at least one antenna control device, said at least one antenna control device having at least one parameter having an influence on said one or more characteristics, said at least one parameter being adjustable by electrical means, the method comprising the steps of:

applying excitations to m user ports, where m is an integer greater than or equal to 2, one and only one of the excitations being applied to each of the user ports, the excitations being not applied successively, the m user ports presenting, at a given frequency, an impedance matrix referred to as "the impedance matrix presented by the user ports" and denoted by $Z_U$;

estimating q real quantities depending on the impedance matrix presented by the user ports, where q is an integer greater than or equal to m, using said m excitations;

using said q real quantities depending on the impedance matrix presented by the user ports, to obtain "tuning control signals"; and applying each of the tuning control signals to one or more of the antenna control devices, each of said parameters being mainly determined by one or more of the tuning control signals.

In the previous sentence, "each of said parameters" clearly means "each said at least one parameter of each said at least one antenna control device of each of the n tunable passive antennas". According to the invention, the given frequency is for instance a frequency greater than or equal to 150 kHz. The specialist understands that the impedance matrix presented by the user ports is a complex matrix of size m by m.

Each of the n tunable passive antennas has a port, referred to as "the signal port of the antenna", comprising two terminals, which can be used to receive and/or to emit electromagnetic waves. Each of the n tunable passive antennas comprises at least one antenna control device, which may comprise one or more other terminals used for other electrical connections. It is assumed that each of the n tunable passive antennas behaves, at the given frequency, with respect to the signal port of the antenna, substantially as a passive antenna, that is to say as an antenna which is linear and does not use an amplifier for amplifying signals received by the antenna or signals emitted by the antenna. As a consequence of linearity, it is possible to define an impedance matrix presented by the tunable passive antennas, the definition of which only considers, for each of the tunable passive antennas, the signal port of the antenna. This matrix is consequently of size n×n. Because of the interactions between the tunable passive antennas, this matrix need not be diagonal. In particular, the invention may be such that this matrix is not a diagonal matrix.

As said above in the prior art section, each of said one or more characteristics may for instance be an electrical characteristic such as an impedance at a specified frequency, or an electromagnetic characteristic such as a directivity pattern at a specified frequency.

As shown below in the first embodiment, each of the n tunable passive antennas may for instance be coupled, directly or indirectly, to one and only one of the user ports. More precisely, for each of the n tunable passive antennas, the signal port of the antenna may for instance be coupled, directly or indirectly, to one and only one of the user ports. For instance, an indirect coupling may be a coupling through a feeder and/or through a directional coupler and/or through a sensing unit. As shown below in the eleventh embodiment, it is for instance possible that each of the n tunable passive antennas is coupled, directly or indirectly, to one or more of the user ports, and that at least one of the n tunable passive antennas is coupled, directly or indirectly, to two or more of the user ports. More precisely, it is for instance possible that: (a) for each of the n tunable passive antennas, the signal port of the antenna is coupled, directly or indirectly, to one or more of the user ports; and (b) for at least one of the n tunable passive antennas, the signal port of the antenna is coupled, directly or indirectly, to two or more of the user ports.

One and only one of the excitations is applied to each of the m user ports, so that there are m excitations applied to the user ports. These m excitations are not applied successively, that is to say: them excitations are not applied one after another. Thus, it is for instance possible that two or more of the excitations are applied simultaneously. Thus, it is for instance possible that the m excitations are applied simultaneously.

According to the invention, each of the excitations may for instance be a bandpass signal. This type of signal is also sometimes improperly referred to as "passband signal" or "narrow-band signal" (in French: "signal à bande étroite"). A bandpass signal is any real signal s(t), where t denotes the time, such that the spectrum of s(t) is included in a frequency interval $[f_C-W/2, f_C+W/2]$, where $f_C$ is a frequency referred to as "carrier frequency" and where W is a frequency referred to as "bandwidth", which satisfies $W<2f_C$. Thus, the Fourier transform of s(t), denoted by S(f), is non-negligible only in the frequency intervals $[-f_C-W/2, -f_C+W/2]$ and $[f_C-W/2, f_C+W/2]$. The complex envelope of the real signal s(t), also referred to as "complex baseband equivalent" or "baseband-equivalent signal", is a complex signal $s_B(t)$ whose Fourier transform $S_B(f)$ is non-negligible only in the frequency interval $[-W/2, W/2]$ and satisfies $S_B(f)=k\, S(f_C+f)$ in this interval, where k is a real constant which is chosen equal to the square root of 2 by some authors. The real part of $s_B(t)$ is referred to as the in-phase component, and the imaginary part of $s_B(t)$ is referred to as the quadrature component. The specialist knows that the bandpass signal s(t) may for instance be obtained:
- as the result of a phase and amplitude modulation of a single carrier at the frequency $f_C$;
- as a linear combination of a first signal and a second signal, the first signal being the product of the in-phase component and a first sinusoidal carrier of frequency $f_C$, the second signal being the product of the quadrature component and a second sinusoidal carrier of frequency $f_C$, the second sinusoidal carrier being 90° out of phase with respect to the first sinusoidal carrier;
- in other ways, for instance without using any carrier, for instance using directly a filtered output of a digital-to-analog converter.

The frequency interval $[f_C-W/2, f_C-W/2]$ is a passband of the bandpass signal. From the definitions, it is clear that, for a given bandpass signal, several choices of carrier frequency $f_C$ and of bandwidth W are possible, so that the passband of the bandpass signal is not uniquely defined. However, any passband of the bandpass signal must contain any frequency at which the spectrum of s(t) is not negligible.

According to the invention, each of the excitations could for instance be a bandpass signal, the bandpass signal having a passband which contains said given frequency. In this case, it would be possible to consider that said given frequency is a carrier frequency. Thus, in this case, each of the excitations could for instance be obtained:
- as the result of a phase and amplitude modulation of a single carrier at said given frequency;
- as a linear combination of a first signal and a second signal, the first signal being the product of the in-phase component and a first sinusoidal carrier at said given frequency, the second signal being the product of the quadrature component and a second sinusoidal carrier at said given frequency;
- in other ways, for instance without using any carrier.

The complex envelope of the real signal s(t) clearly depends on the choice of a carrier frequency $f_C$. However, for a given carrier frequency, the complex envelope of the real signal s(t) is uniquely defined, for a given choice of the real constant k.

According to the invention, for a given choice of the real constant k, it is possible that, said given frequency being considered as a carrier frequency, each of the excitations has one and only one complex envelope, the m complex envelopes of the m excitations being linearly independent in the set of complex functions of one real variable, regarded as a vector space over the field of complex numbers. It was found that this characteristic can be used in such a way that the effects of each of the excitations can be identified with suitable signal processing, as if the excitations had been applied successively to the user ports, so that, as explained below in the presentation of the first embodiment, said m excitations can be used to estimate the q real quantities depending on the impedance matrix presented by the user ports. The specialist understands that this characteristic of the method of the invention cannot be obtained with a plurality of apparatuses for automatically adjusting a single tunable passive antenna, used for automatically adjusting a plurality of tunable passive antennas, as presented above in the prior art section. The specialist also understands that this characteristic of the method of the invention avoids the interferences which wreak havoc on the operation of a plurality of apparatuses for automatically adjusting a single tunable passive antenna, used for automatically adjusting a plurality of tunable passive antennas, in the case where the interactions between the tunable passive antennas are not very small. Moreover, as discussed below in the presentations of the first and third embodiments, this characteristic is compatible with the requirements of typical specifications of radio transmitters used for MIMO wireless communication, because the generation of excitations having this characteristic is compatible with the requirements of standards typically applicable to MIMO wireless networks. For instance, this characteristic is compatible with all MIMO emission modes of the LTE-Advanced standards. Consequently, the invention overcomes the above-mentioned limitations of prior art.

According to the invention, for a given choice of the real constant k, it is possible that, said given frequency being considered as a carrier frequency, each of the excitations has one and only one complex envelope, the m complex envelopes being orthogonal to one another for a given scalar product ("scalar product" is also referred to as "inner product"). The advantage of this characteristic will be explained below in the presentation of the second embodiment.

According to the invention, each of said q real quantities depending on the impedance matrix presented by the user ports may for instance be a real quantity representative of the impedance matrix presented by the user ports.

According to the invention, each of said q real quantities depending on the impedance matrix presented by the user ports may for instance be substantially proportional to the absolute value, or the phase, or the real part, or the imaginary part of an entry of the impedance matrix presented by the user ports, or of an entry of the inverse of the impedance matrix presented by the user ports (that is, the admittance matrix presented by the user ports), or of an entry of a matrix of the voltage reflection coefficients at the user ports, defined as being equal to $(Z_U-Z_O)(Z_U+Z_O)^{-1}$, where $Z_O$ is a reference impedance matrix.

The specialist understands that the tuning control signals have an effect on each of said parameters, so that they may have an influence on the impedance matrix presented by the user ports. According to the invention, it is possible that the tuning control signals are such that the impedance matrix presented by the user ports decreases or minimizes a norm of the image of the impedance matrix presented by the user ports under a matrix function, the matrix function being a function from a set of square complex matrices into the same set of square complex matrices. For instance, this norm may be a vector norm or a matrix norm. For instance, if we define a wanted impedance matrix, the wanted impedance matrix being denoted by $Z_W$, said matrix function may be defined by $$f(Z_U)=Z_U-Z_W \quad (1)$$

in which case the image of $Z_U$ under the matrix function is a difference of impedance matrices, or by $$f(Z_U)=Z_U^{-1}-Z_W^{-1} \quad (2)$$

in which case the image of $Z_U$ under the matrix function is a difference of admittance matrices, or by $$f(Z_U)=(Z_U-Z_W)(Z_U+Z_W)^{-1} \quad (3)$$

in which case the image of $Z_U$ under the matrix function is a matrix of the voltage reflection coefficients at the user ports. We note that each of these matrix functions is such that $f(Z_W)$ is a null matrix, so that the norm of $f(Z_W)$ is zero.

An apparatus implementing the method of the invention is an automatically tunable antenna array having m "user ports", where m is an integer greater than or equal to 2, the m user ports presenting, at a given frequency, an impedance matrix referred to as "the impedance matrix presented by the user ports" and denoted by $Z_U$, the automatically tunable antenna array comprising:

n tunable passive antennas, where n is an integer greater than or equal to 2, each of the n tunable passive antennas comprising at least one antenna control device, one or more characteristics of said each of the n tunable passive antennas being controlled using said at least one antenna control device, said at least one antenna control device having at least one parameter having an influence on said one or more characteristics, said at least one parameter being adjustable by electrical means;

at least m sensing units, each of the sensing units delivering one or more "sensing unit output signals", each of the sensing unit output signals being mainly determined by one or more electrical variables;

a signal processing unit, the signal processing unit estimating q real quantities depending on the impedance matrix presented by the user ports, where q is an integer greater than or equal to m, using the sensing unit output signals obtained form excitations applied to the user ports, one and only one of the excitations being applied to each of the user ports, the m excitations being not applied successively, the signal processing unit delivering a "tuning instruction" as a function of said q real quantities depending on the impedance matrix presented by the user ports; and a tuning control unit, the tuning control unit receiving the tuning instruction from the signal processing unit, the tuning control unit delivering "tuning control signals" to the tunable passive antennas, the tuning control signals being determined as a function of the tuning instruction, each of said parameters being mainly determined by one or more of the tuning control signals.

In the previous sentence, "each of said parameters" clearly means "each said at least one parameter of each said at least one antenna control device of each of the n tunable passive antennas".

The m excitations are not applied successively, that is to say: the m excitations are not applied one after the other. Thus, it is for instance possible that two or more of the excitations are applied simultaneously.

It is for instance possible that each of the excitations is a bandpass signal. It is for instance possible that each of these bandpass signals has a passband which contains said given frequency.

For instance, each of said electrical variables may be a voltage, or an incident voltage, or a reflected voltage, or a current, or an incident current, or a reflected current. For instance, each of said electrical variables may be sensed (or measured) at one of said user ports.

As explained above, it is for instance possible that each of the n tunable passive antennas is coupled, directly or indirectly, to one and only one of the user ports. As explained above, it is for instance possible that each of the n tunable passive antennas is coupled, directly or indirectly, to one or more of the user ports, and that at least one of the n tunable passive antennas is coupled, directly or indirectly, to two or more of the user ports.

The specialist understands that the tunable passive antennas may be such that the tuning control signals have an effect on the impedance matrix presented by the user ports, so that a closed-loop control scheme exists because each of the tuning control signals is determined as a function of said real quantities depending on the impedance matrix presented by the user ports. The specialist understands that the automatically tunable antenna array of the invention is adaptive in the sense that said parameters are varied with time as a function of the sensing unit output signals, which are each mainly determined by one or more electrical variables.

The specialist understands that, if the tuning control signals have an effect on the impedance matrix presented by the user ports, the tuning instruction may for instance be determined as being a tuning instruction which, among a set of possible tuning instructions, produces an impedance matrix presented by the user ports which decreases or minimizes a norm of the image of the impedance matrix presented by the user ports under a matrix function, the matrix function being for instance one of the matrix functions f such that $f(Z_U)$ is given by the equation (1) or the equation (2) or the equation (3). The specialist also understands that the tuning instruction may for instance be determined as being a tuning instruction which provides an impedance matrix presented by the user ports which is substantially equal to the wanted impedance matrix, for instance a tuning instruction such that $Z_U=Z_W$.

BRIEF DESCRIPTION OF THE DRAWINGS

Other advantages and characteristics will appear more clearly from the following description of particular embodiments of the invention, given by way of non-limiting examples, with reference to the accompanying drawings in which.

DETAILED DESCRIPTION OF SOME EMBODIMENTS

First embodiment.

Figure 1:
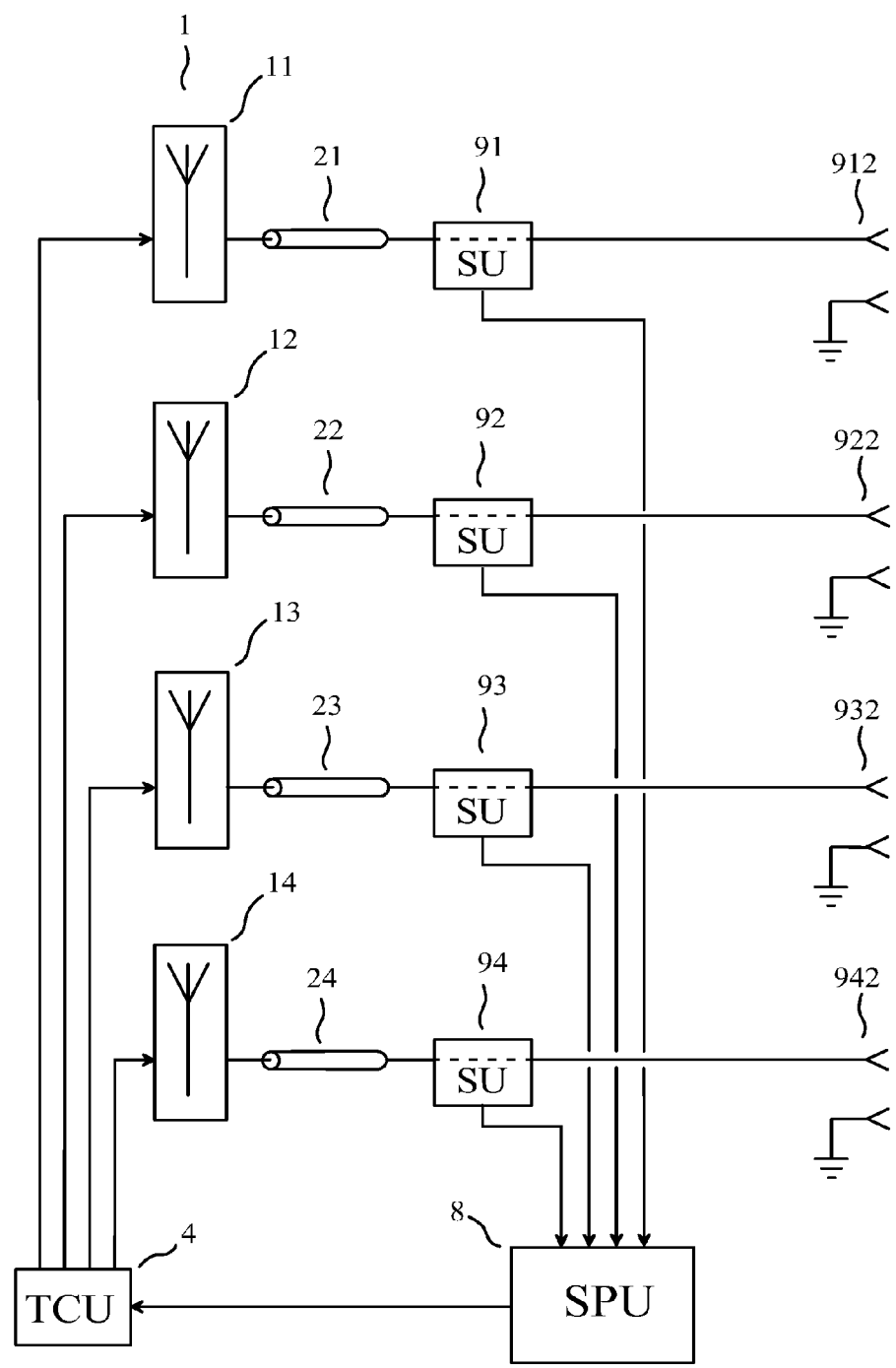
FIG. 1 shows the block diagram of an automatically tunable antenna array of the invention, comprising 4 tunable passive antennas (first embodiment)

As a first embodiment of a device of the invention, given by way of non-limiting example, we have represented in FIG. 1 the block diagram of an automatically tunable antenna array having m=4 user ports (912) (922) (932) (942), the m user ports presenting, at a given frequency greater than or equal to 30 MHz, an impedance matrix referred to as "the impedance matrix presented by the user ports" and denoted by $Z_U$, the automatically tunable antenna array comprising:

n=m=4 tunable passive antennas (11) (12) (13) (14), the n tunable passive antennas operating simultaneously in a given frequency band, the n tunable passive antennas forming a multiport antenna array (1), each of the tunable passive antennas comprising at least one antenna control device, one or more characteristics of said each of the tunable passive antennas being controlled using said at least one antenna control device, said at least one antenna control device having at least one parameter having an effect on said one or more characteristics, said at least one parameter being adjustable by electrical means;

m sensing units (91) (92) (93) (94), each of the sensing units delivering two "sensing unit output signals", each of the sensing unit output signals being determined by one electrical variable sensed (or measured) at one of the user ports;

n feeders (21) (22) (23) (24), each of the feeders having a first end coupled to a signal port of one and only one of the tunable passive antennas, each of the feeders having a second end coupled to one and only one of the user ports, through one and only one of the sensing units;

a signal processing unit (8), the signal processing unit estimating q real quantities depending on the impedance matrix presented by the user ports, where q is an integer greater than or equal to m, using the sensing unit output signals obtained for m excitations applied to the user ports, one and only one of the excitations being applied to each user ports, each of the excitations being a bandpass signal, the signal processing unit delivering a "tuning instruction" as a function of said q real quantities depending on the impedance matrix presented by the user ports; and a tuning control unit (4), the tuning control unit receiving the tuning instruction from the signal processing unit (8), the tuning control unit delivering "tuning control signals" to the tunable passive antennas (11) (12) (13) (14), the tuning control signals being determined as a function of the tuning instruction, each of said parameters being determined by one or more of the tuning control signals.

Each of the sensing units (91) (92) (93) (94) may for instance be such that the two sensing unit output signals delivered by said each of the sensing units comprise: a first sensing unit output signal proportional to a first electrical variable, the first electrical variable being a voltage across one of the user ports; and a second sensing unit output signal proportional to a second electrical variable, the second electrical variable being a current flowing in said one of the user ports. Said voltage across one of the user ports may be a complex voltage and said current flowing in said one of the user ports may be a complex current. Alternatively, each of the sensing units (91) (92) (93) (94) may for instance be such that the two sensing unit output signals delivered by said each of the sensing units comprise: a first sensing unit output signal proportional to a first electrical variable, the first electrical variable being an incident voltage (which may also be referred to as "forward voltage") at one of the user ports; and a second sensing unit output signal proportional to a second electrical variable, the second electrical variable being a reflected voltage at said one of the user ports. Said incident voltage at one of the user ports may be a complex incident voltage and said reflected voltage at said one of the user ports may be a complex reflected voltage.

Each of the electrical variables is substantially zero if no excitation is applied to any one of the user ports and if the tunable passive antennas are not excited by an incident electromagnetic field.

The specialist understands that each of the n tunable passive antennas is coupled, through one of the feeders and one sensing unit, to one of the user ports. Consequently, each of the n tunable passive antennas is coupled, indirectly, to one of the user ports. As shown in FIG. 1, it is possible to consider that each of the sensing units includes: a first port connected to said second end of one of the feeders; and a second port which is one of the user ports.

An external device has m output ports, each of the output ports of the external device being coupled to one and only one of the user ports, each of the user ports being coupled to one and only one of the output ports of the external device. The external device is not shown in FIG. 1. The external device applies m excitations to the user ports, and informs the signal processing unit (8) of this action. One and only one of said m excitations is applied to each of the user ports, two or more of the excitations being applied simultaneously. Each of said m excitations is a bandpass signal having a passband which contains said given frequency. Said given frequency being considered as a carrier frequency, each of the excitations has one and only one complex envelope (or complex baseband equivalent), the m complex envelopes being linearly independent in E, where E is the set of complex functions of one real variable, regarded as a vector space over the field of complex numbers.

Let us number the user ports from 1 to m, and let us number the excitations from 1 to m, in such a way that, if a is an integer greater than or equal to 1 and less than or equal to m, the excitation number a is applied to the user port number a. For instance, if we use t to denote time, the excitations may be such that, for any integer a greater than or equal to 1 and less than or equal to m, the excitation number a consists of a current $i_a(t)$, of complex envelope $i_{E\ a}(t)$, applied to the user port number a, the complex envelopes $i_{E\ 1}(t), \ldots, i_{E\ m}(t)$ being linearly independent in E. Let us use $i_E(t)$ to denote the column vector of the complex envelopes $i_{E\ 1}(t), \ldots, i_{E\ m}(t)$. Let us use $u_a(t)$ to denote the voltage across the user port number a, and $u_{Ea}(t)$ to denote the complex envelope of $u_a(t)$. Let us use $u_E(t)$ to denote the column vector of the complex envelopes $u_{E\ 1}(t), \ldots, u_{E\ m}(t)$. It is possible to show that, if the bandwidth of the complex envelopes $i_{E\ 1}(t), \ldots, i_{E\ m}(t)$ is sufficiently narrow, we have $$u_E(t) = Z_U i_E(t) \quad (4)$$

If we consider the equation (4) for a fixed value of t, then the entries of $u_E(t)$ and $i_E(t)$ are complex numbers. In this context, for m≥2 it is not possible to solve the equation (4) to derive $Z_U$ based on the knowledge of $u_E(t)$ and $i_E(t)$ for a fixed value of t. In contrast, if we consider the equation (4) where t is a variable, then the entries of $i_E(t)$ are linearly independent vectors of E. Thus, if we use S to denote the span of $i_{E\ 1}(t), \ldots, i_{E\ m}(t)$ in E, we find that $i_{E\ 1}(t), \ldots, i_{E\ m}(t)$ is a basis of S. In this context, the equation (4) teaches that each entry of $u_E(t)$ lies in S, and that, for any integer a greater than or equal to 1 and less than or equal to m, the coordinates of the vector $U_{E\ a}(t)$ in the basis $i_{E\ 1}(t), \ldots, i_{E\ m}(t)$ are the entries of the row a of $Z_U$. Since these coordinates are unique, the equation (4) can be used to derive $Z_U$ based on the knowledge of (t) and $i_E(t)$, where t is a variable. Thus, the effects of the different excitations can be identified with suitable signal processing, as if the different excitations had been applied successively to the user ports, so that the m excitations can be used to estimate the impedance matrix presented by the user ports, and any real quantity depending on the impedance matrix presented by the user ports. Thus, m excitations which are not applied successively can be used in the invention, whereas they cannot be used in the method disclosed in the ninth embodiment of said French patent application No. 14/00666 and of said PCT application No. PCT/M2015/051644.

We have just considered, as an example, the case in which the excitations are such that, for any integer a greater than or equal to 1 and less than or equal to m, the excitation number a consists of a current $i_a(t)$, of complex envelope $i_{E\ a}(t)$, applied to the user port number a, the complex envelopes $i_{E\ 1}(t), \ldots, i_{E\ m}(t)$ being linearly independent in E. Alternatively, the excitations could for instance be such that, for any integer a greater than or equal to 1 and less than or equal to m, the excitation number a consists of a voltage $u_a(t)$, of complex envelope $u_{E\ a}(t)$, applied to the user port number a, the complex envelopes $u_{E\ 1}(t), \ldots, u_{E\ m}(t)$ being linearly independent in E. In this case, using a proof similar to the one presented above for applied currents, we can show that the effects of the different excitations can be identified with suitable signal processing, as if the different excitations had been applied successively to the user ports, so that the m excitations can be used to estimate the impedance matrix presented by the user ports, and any real quantity depending on the impedance matrix presented by the user ports.

We observe that, in standards typically applicable to MIMO wireless networks, signals having complex envelopes which are linearly independent in E are used as reference signals (also referred to as pilot signals) for MIMO channel estimation. We see that these signals used as reference signals, if they are applied to the user ports, can be used as excitations having complex envelopes which are linearly independent in E. Consequently, this first embodiment is compatible with the requirements of standards typically applicable to MIMO wireless networks. This question is further discussed below, in the third embodiment.

The specialist understands how the signal processing unit (8) can use the sensing unit output signals obtained for the m excitations applied to the user ports, them excitations being bandpass signals having complex envelopes which are linearly independent in E, to estimate q real quantities depending on the impedance matrix presented by the user ports. In this first embodiment, $q=2m^2$ and the q real quantities depending on the impedance matrix presented by the user ports fully determine the impedance matrix presented by the user ports. For instance, let us consider the case where the two sensing unit output signals of any one of said sensing units are proportional to a complex voltage across one of the user ports and to a complex current flowing in said one of the user ports, respectively, and where the excitation number a consists of a current applied to the user port number a, as explained above. Based on the explanations about the equation (4), the specialist understands that all entries of $Z_U$ can be determined once the m excitations have been applied. For instance, said q real quantities depending on the impedance matrix presented by the user ports may consist of $m^2$ real numbers each proportional to the real part of an entry of $Z_U$ and of $m^2$ real numbers each proportional to the imaginary part of an entry of $Z_U$. For instance, said q real quantities depending on the impedance matrix presented by the user ports may consist of $m^2$ real numbers each proportional to the absolute value of an entry of $Z_U$ and of $m^2$ real numbers each proportional to the argument of an entry of $Z_U$.

For instance, if the sensing units (91) (92) (93) (94) are numbered from 1 to m, we may consider the special case in which, for any integer a greater than or equal to 1 and less than or equal to m, the sensing unit number a delivers: a first sensing unit output signal proportional to the voltage $u_a(t)$ across the user port number a ; and a second sensing unit output signal proportional to the current $i_a(t)$ flowing in this user port. In this case, the signal processing unit (8) may for instance perform an in-phase/quadrature (I/Q) demodulation (homodyne reception) of all sensing unit output signals, to obtain, for any integer a greater than or equal to 1 and less than or equal to m, four analog signals: the real part of $u_{E\ a}(t)$; the imaginary part of $u_{E\ a}(t)$; the real part of $i_{E\ a}(t)$; and the imaginary part of $i_{E\ a}(t)$. These analog signals may then be converted into digital signals and further processed in the digital domain, to estimate said q real quantities depending on the impedance matrix presented by the user ports, which fully characterize the impedance matrix presented by the user ports.

The multiport antenna array (1) is such that each said at least one parameter of each said at least one antenna control device of each of the n tunable passive antennas has an effect on $Z_U$. Since each of said parameters is determined by one or more of the tuning control signals, the tuning control signals have an effect on $Z_U$. Thus, the tuning instruction has an effect on $Z_U$. In this first embodiment, the tuning instruction is such that the impedance matrix presented by the user ports approximates a wanted impedance matrix $Z_W$.

Since, as explained above, the q real quantities depending on the impedance matrix presented by the user ports fully determine $Z_U$, the signal processing unit determines and delivers a tuning instruction such that the resulting tuning control signals produce a $Z_U$ such that a norm of $Z_U - Z_W$ is sufficiently small. The specialist understands how the tuning instruction can be determined. The operation of the signal processing unit is such that a tuning instruction is generated at the end of a tuning sequence, and is valid until a next tuning instruction is generated at the end of a next tuning sequence.

The external device also delivers "instructions of the external device" to the signal processing unit (8), said instructions of the external device informing the signal processing unit that said excitations have been applied, or are being applied, or will be applied. For instance, the external device may initiate a tuning sequence when it informs the signal processing unit that it will apply the excitations to the user ports. For instance, the signal processing unit may end the tuning sequence when, after the excitations have been applied, a tuning instruction has been delivered. Additionally, the external device provides other signals to the signal processing unit, and/or receives other signals from the signal processing unit. The electrical links needed to deliver said instructions of the external device and to carry such other signals are not shown in FIG. 1.

The tuning instruction may be of any type of digital message. In this first embodiment, an adaptive process is carried out by the signal processing unit, during each tuning sequence. The adaptive process is the following: during each tuning sequence, the signal processing unit estimates the q real quantities depending on the impedance matrix presented by the user ports, and uses an algorithm to determine a tuning instruction such that the impedance matrix presented by the user ports approximates $Z_W$. The algorithm is based on the frequency of operation and on the q real quantities depending on the impedance matrix presented by the user ports, and it takes into account the tuning instruction which was applicable while the sensing units delivered the sensing unit output signals used to estimate the q real quantities depending on the impedance matrix presented by the user ports.

If the tuning control unit (4) was not present, the tuning instruction would have no effect on $Z_U$. The specialist understands that, in this case, $Z_U$ would depend on the frequency of operation and on the electromagnetic characteristics of the volume surrounding the antennas. In particular, if the multiport antenna array (1) was built in a portable transceiver, for instance a user equipment (UE) of an LTE wireless network, $Z_U$ would depend on the position of the body of the user, a phenomenon referred to as "user interaction". The specialist understands that the automatically tunable antenna array shown in FIG. 1 may be used to automatically reduce or cancel any variation in $Z_U$ caused by a variation in the frequency of operation, and/or caused by the user interaction.

In this first embodiment, n=m=4. Thus, it is possible that n is greater than or equal to 3, it is possible that n is greater than or equal to 4, it is possible that m is greater than or equal to 3, and it is possible that m is greater than or equal to 4.

Figure 2:
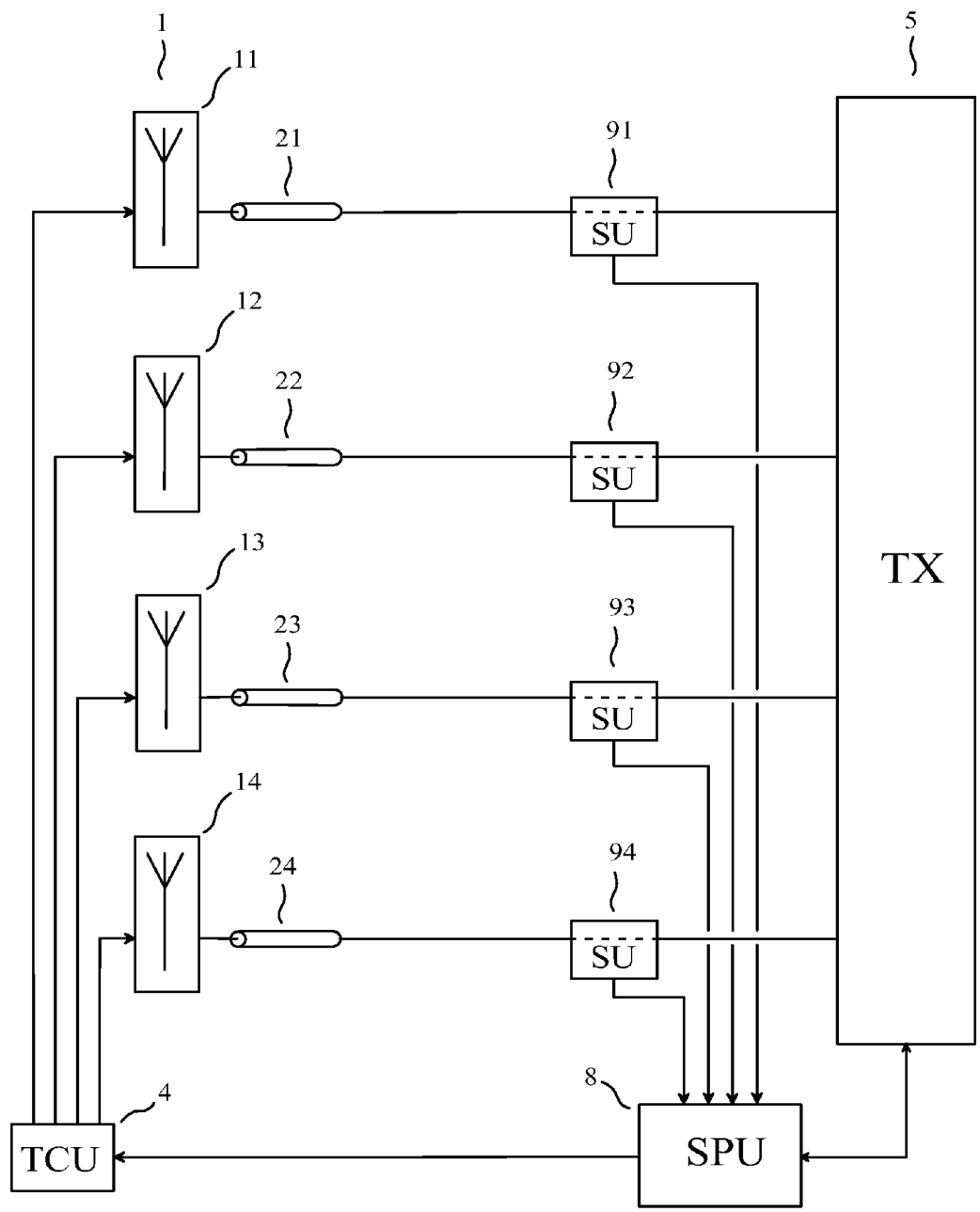
FIG. 2 shows the block diagram of a transmitter for radio communication using the automatically tunable antenna array shown in FIG. 1 (first embodiment)

As an example, FIG. 2 shows the block diagram of a transmitter for radio communication (or a transceiver for radio communication) using the automatically tunable antenna array shown in FIG. 1. The transmitter for radio communication (or transceiver for radio communication) shown in FIG. 2 comprises:
- the tunable passive antennas (11) (12) (13) (14) forming a multiport antenna array (1) of FIG. 1;
- the sensing units (91) (92) (93) (94) of FIG. 1;
- the feeders (21) (22) (23) (24) of FIG. 1;
- the signal processing unit (8) of FIG. 1;
- the tuning control unit (4) of FIG. 1; and
- a radio device (5) which consists of all parts of the transmitter (or transceiver) which are not shown elsewhere in FIG. 2, the radio device having m=4 radio ports, the radio device delivering "tuning sequence instructions" which indicate when a tuning sequence is being performed, m excitations being delivered by the radio ports during said tuning sequence, one and only one of the excitations being delivered by each of the radio ports.

In FIG. 2, each of the feeders has a first end coupled to a signal port of one and only one of the tunable passive antennas, and each of the feeders has a second end coupled to one and only one of the radio ports, through one and only one of the sensing units. The m radio ports see, at the given frequency, an impedance matrix referred to as "the impedance matrix seen by the radio ports", which clearly may be considered as being the impedance matrix presented by the user ports and denoted by $Z_U$.

The radio device (5) performs functions which were, in the explanations provided above about FIG. 1, assigned to the external device. The tuning sequence instructions are delivered to the signal processing unit (8). They perform functions which were, in the explanations provided above about FIG. 1, assigned to the instructions of the external device. Additionally, the radio device provides other signals to the signal processing unit, and/or receives other signals from the signal processing unit.

The signal processing unit (8) also estimates one or more quantities each depending on the power delivered by the radio ports. Information on said quantities each depending on the power delivered by the output ports is sent to the radio device (5), in which it may be used for radiated power control when the transmitter (or transceiver) transmits.

The transmitter (or transceiver) is used for MIMO wireless transmission in a cellular network. The excitations have complex envelopes which are compatible with the requirements of standards typically applicable to MIMO wireless networks.

In the automatically tunable antenna array, automatic adjustment of the parameters of the antenna control devices are used to reduce or cancel any variation in $Z_U$ caused by a variation in the frequency of operation, and/or caused by the user interaction. Consequently, this first embodiment provides a solution to the problem of automatically adjusting the plurality of tunable passive antennas coupled to a radio transmitter used for MIMO wireless communication, in a manner that complies with standards typically applicable to MIMO wireless networks.

Second embodiment.

The second embodiment of a device of the invention, given by way of non-limiting example, also corresponds to the automatically tunable antenna array having m=4 user ports (912) (922) (932) (942) shown in FIG. 1, and all explanations provided for the first embodiment are applicable to this second embodiment. Additionally, in this second embodiment, the complex envelopes of the m excitations are orthogonal to each other. More precisely, the complex envelopes of the m excitations are orthogonal to one another, for a given scalar product. Moreover, the scalar product of any one of the m complex envelopes and itself is nonzero, so that the orthogonality requirements entail that the m complex envelopes are linearly independent. We may use <f|g> to denote the scalar product of two functions f and g, which may be any scalar product satisfying the properties of conjugate symmetry, linearity in the second argument, and positivity (we do not require positive definiteness). For instance, we may consider that each of said complex envelope is square-integrable, and that the scalar product is the usual scalar product of the Hilbert space of square-integrable functions of a real variable, which, for two square-integrable functions f and g, is given by $$\langle f|g\rangle = \int_{-\infty}^{\infty} \overline{f(x)} g(x) dx \quad (5)$$

in which the bar above f(x) denotes the complex conjugate. Alternatively, we may for instance consider that two functions f and g are sampled at the same points in time, to obtain the samples f[j] off and the samples g[j] of g, where j is an integer, and that the scalar product is the usual scalar product of finite energy sequences, which is given by $$\langle f|g\rangle = \sum_{j=-\infty}^{\infty} \overline{f[j]} g[j] \quad (6)$$

Let us for instance consider the case in which the excitations are such that, for any integer a greater than or equal to 1 and less than or equal to m, the excitation number a consists of a current $i_a(t)$, of complex envelope $i_{E\,a}(t)$, applied to the user port number a, the complex envelopes $i_{E\,1}(t), \ldots, i_{E\,m}(t)$ being orthogonal to each other. In this case, the equation (4) is applicable, and the coordinates of the vector $u_{E\,a}(t)$ in the basis $i_{E\,1}(t), \ldots, i_{E\,m}(t)$ of S can be easily computed, since, for any integer b greater than or equal to 1 and less than or equal to m, the b-th coordinate of the vector $u_{E\,a}(t)$ in the basis $i_{E\,1}(t), \ldots, i_{E\,m}(t)$, denoted by $z_{a\,b}$ is clearly given by $$z_{ab} = \frac{\langle i_{Eb}|u_{Ea}\rangle}{\langle i_{Eb}|i_{Eb}\rangle} \quad (7)$$

Moreover, in this case, the coordinates of the vector $u_{E\,a}(t)$ in the basis $i_{E\,1}(t), \ldots, i_{E\,m}(t)$ being the entries of the row a of $Z_U$, we find that $z_{a\,b}$ is the entry of the row a and the column b of $Z_U$. Thus, the equation (7) can be used to derive $Z_U$ based on the knowledge of $u_E(t)$ and $i_E(t)$, where t is a variable. Thus, the effects of the different excitations can be identified with suitable signal processing, as if the different excitations had been applied successively to the user ports, so that the m excitations can be used to estimate the impedance matrix presented by the user ports, and any real quantity depending on the impedance matrix presented by the user ports.

We have just considered, as an example, the case in which the excitations are such that, for any integer a greater than or equal to 1 and less than or equal to m, the excitation number a consists of a current $i_a(t)$, of complex envelope $i_{E\,a}(t)$, applied to the user port number a, the complex envelopes $i_{E\,1}(t), \ldots, i_{Em}(t)$ being orthogonal to each other. Alternatively, the excitations could for instance be such that, for any integer a greater than or equal to 1 and less than or equal to m, the excitation number a consists of a voltage $u_a(t)$, of complex envelope $u_{E\,a}(t)$, applied to the user port number a, the complex envelopes $u_{E\,1}(t), \ldots, u_{E\,m}(t)$ being orthogonal to each other. In this case, using a proof similar to the one presented above for applied currents, we can show that the effects of the different excitations can be identified with suitable signal processing, as if the different excitations had been applied successively to the user ports, so that the m excitations can be used to estimate the impedance matrix presented by the user ports, and any real quantity depending on the impedance matrix presented by the user ports.

The specialist understands how to generate m excitations having complex envelopes which are orthogonal to one another. For instance, let us consider m arbitrary sequences of data symbols, each sequence being modulated on a single sub-carrier of an orthogonal frequency division multiplexing (OFDM) signal, different sequences being modulated on different sub-carriers. These m modulated sub-carriers are orthogonal to one another, so that each of these modulated sub-carriers could be used as the complex envelope of one of them excitations. For instance, orthogonality also exists between any two different resource elements of an OFDM signal (a resource element means one OFDM sub-carrier for the duration of one OFDM symbol), so that m different resource elements could each be used to obtain the complex envelope of one of them excitations.

The specialist understands how the signal processing unit (8) can use the sensing unit output signals obtained for them excitations applied to the user ports, them excitations being bandpass signals having complex envelopes which are orthogonal to one another, to estimate q real quantities depending on the impedance matrix presented by the user ports. For instance, let us consider the case where the two sensing unit output signals of any one of said sensing units are proportional to a complex voltage across one of the user ports and to a complex current flowing in said one of the user ports, respectively, and where the excitation number a consists of a current applied to the user port number a. Based on the explanations about the equation (7), the specialist understands that all entries of $Z_U$ can be determined once the m different excitations have been applied.

For instance, if the sensing units (91) (92) (93) (94) are numbered from 1 to m, we may consider the special case in which, for any integer a greater than or equal to 1 and less than or equal to m, the sensing unit number a delivers: a first sensing unit output signal proportional to the voltage $u_a(t)$ across the user port number a; and a second sensing unit output signal proportional to the current $i_a(t)$ flowing in the user port number a. In this case, the signal processing unit (8) may for instance perform a down-conversion of all sensing unit output signals, followed by an in-phase/quadrature (I/Q) demodulation (heterodyne reception), to obtain, for any integer a greater than or equal to 1 and less than or equal to m, four analog signals: the real part of $u_{E\,a}(t)$; the imaginary part of $u_{E\,a}(t)$; the real part of $i_{E\,a}(t)$; and the imaginary part of $i_{E\,a}(t)$. These analog signals may then be converted into digital signals and further processed in the digital domain, based on equation (6) and on equation (7) as explained above, to estimate said q real quantities depending on the impedance matrix presented by the user ports, which fully characterize the impedance matrix presented by the user ports.

Third embodiment (best mode).

The third embodiment of a device of the invention, given by way of non-limiting example and best mode of carrying out the invention, also corresponds to the automatically tunable antenna array having m=4 user ports (912) (922) (932) (942) shown in FIG. 1, and all explanations provided for the first embodiment are applicable to this third embodiment. Additionally, in this third embodiment, each of the complex envelopes of the m excitations is the sum of a first complex signal and a second complex signal, the first complex signal being referred to as the primary component of the complex envelope, the second complex signal being referred to as the secondary component of the complex envelope, the primary components of the m complex envelopes being orthogonal to each other, each of the primary components of the m complex envelopes being orthogonal to each of the secondary components of the m complex envelopes. More precisely, the primary components of the m complex envelopes are orthogonal to one another, for a given scalar product, and each of the primary components of the m complex envelopes is orthogonal to each of the secondary components of the m complex envelopes, for the given scalar product. Moreover, the scalar product of any one of the primary components of the m complex envelopes and itself is nonzero, so that the orthogonality requirements entail that the m complex envelopes are linearly independent.

Let us for instance consider the case in which the excitations are such that, for any integer a greater than or equal to 1 and less than or equal to m, the excitation number a consists of a current $i_a(t)$, of complex envelope $i_{E\,a}(t)$, applied to the user port number a, the complex envelope $i_{E\,a}(t)$ being of the form $$i_{E\,a}(t) = i_{C\,a}(t) + i_{D\,a}(t) \tag{8}$$

where $i_{C\,a}(t)$ is the primary component of the complex envelope, and $i_{D\,a}(t)$ is the secondary component of the complex envelope, the primary components $i_{C\,1}(t), \ldots, i_{Cm}(t)$ of them complex envelopes being orthogonal to each other, and each of the primary components $i_{C\,1}(t), \ldots, i_{C\,m}(t)$ of the m complex envelopes being orthogonal to each of the secondary components $i_{D\,1}(t), \ldots, i_{D\,m}(t)$ of the m complex envelopes. In this case, the equation (4) is applicable, and the coordinates of the vector $u_{E\,a}(t)$ in the basis $i_{E\,1}(t), \ldots, i_{E\,m}(t)$ of S can be easily computed, since, for any integer b greater than or equal to 1 and less than or equal to m, the b-th coordinate of the vector $u_{E\,a}(t)$ in the basis $i_{E\,1}(t), \ldots, i_{E\,m}(t)$, denoted by $z_{a\,b}$, is clearly given by $$z_{ab} = \frac{\langle i_{Cb} | u_{Ea} \rangle}{\langle i_{Cb} | i_{Cb} \rangle} \tag{9}$$

Moreover, in this case, the coordinates of the vector $u_{E\,a}(t)$ in the basis $i_{E\,1}(t), \ldots, i_{E\,m}(t)$ being the entries of the row a of $Z_U$, we find that $z_{a\,b}$ is the entry of the row a and the column b of $Z_U$. Thus, the equation (9) can be used to derive $Z_U$ based on the knowledge of $u_E(t)$ and $i_{C\,1}(t), \ldots, i_{C\,m}(t)$, where t is a variable. Thus, the effects of the different excitations can be identified with suitable signal processing, as if the different excitations had been applied successively to the user ports, so that the m excitations can be used to estimate the impedance matrix presented by the user ports, and any real quantity depending on the impedance matrix presented by the user ports.

We have just considered, as an example, the case in which the excitations are such that, for any integer a greater than or equal to 1 and less than or equal to m, the excitation number a consists of a current $i_a(t)$, of complex envelope $i_{E\,a}(t)$, applied to the user port number a, the complex envelope $i_{E\,a}(t)$ being the sum of $i_{C\,a}(t)$ and $i_{D\,a}(t)$, where $i_{C\,a}(t)$ is the primary component of the complex envelope, and $i_{D\,a}(t)$ is the secondary component of the complex envelope, the primary components $i_{C1}(t), \ldots, i_{Cm}(t)$ of the m complex envelopes being orthogonal to each other, each of the primary components $i_{C1}(t), \ldots, i_{Cm}(t)$ of the m complex envelopes being orthogonal to each of the secondary components $i_{D1}(t), \ldots, i_{Dm}(t)$ of the m complex envelopes. Alternatively, the excitations could for instance be such that, for any integer a greater than or equal to 1 and less than or equal to m, the excitation number a consists of a voltage $u_a(t)$, of complex envelope $u_{E\,a}(t)$, applied to the user port number a, the complex envelope $u_{E\,a}(t)$ being the sum of $u_{C\,a}(t)$ and $u_{D\,a}(t)$, where $u_{C\,a}(t)$ is the primary component of the complex envelope, and $u_{D\,a}(t)$ is the secondary component of the complex envelope, the primary components $u_{C1}(t), \ldots, u_{Cm}(t)$ of them complex envelopes being orthogonal to each other, each of the primary components $u_{C\,1}(t), \ldots, u_{C\,m}(t)$ of the m complex envelopes being orthogonal to each of the secondary components $u_{D1}(t), \ldots, u_{Dm}(t)$ of the m complex envelopes. In this case, using a proof similar to the one presented above for applied currents, we can show that the effects of the different excitations can be identified with suitable signal processing, as if the different excitations had been applied successively to the user ports, so that the m excitations can be used to estimate the impedance matrix presented by the user ports, and any real quantity depending on the impedance matrix presented by the user ports.

We observe that the type of excitations used in the second embodiment is a special case of the more general type of excitations used in this third embodiment, since excitations used in this third embodiment and having zero secondary components can be used in the second embodiment.

The specialist understands how to generate m excitations having complex envelopes, each of said complex envelopes being the sum of a first complex signal and a second complex signal, the first complex signal being referred to as the primary component of the complex envelope, the second complex signal being referred to as the secondary component of the complex envelope, the primary components of the m complex envelopes being orthogonal to each other, each of the primary components of the m complex envelopes being orthogonal to each of the secondary components of the m complex envelopes. For instance, let us consider m arbitrary sequences of data symbols, each sequence being modulated on a single sub-carrier of an OFDM signal, different sequences being modulated on different sub-carriers. The sub-carriers modulated by the m arbitrary sequences are orthogonal to one another, and each of them is orthogonal to any combination of sub-carriers which are not modulated by any one of the m arbitrary sequences, and which may carry any data. Thus, each of the sub-carriers modulated by the m arbitrary sequences could be used as the primary component of the complex envelope of one of the m excitations, and any combination of sub-carriers which are not modulated by any one of the m arbitrary sequences, and which may carry any data, could be used as the secondary component of the complex envelope of any one of them excitations. For instance, let us consider m different resource elements of an OFDM signal. The m different resource elements are orthogonal to one another, and each of the m different resource elements is orthogonal to any combination of resource elements which are not one of said m different resource elements. Thus, each of said m different resource elements could be used to obtain the primary component of the complex envelope of one of them excitations, and any combination of resource elements which are not one of said m different resource elements could be used to obtain the secondary component of the complex envelope of any one of the m excitations.

We observe that, in typical standards applicable to MIMO wireless networks, OFDM or single carrier frequency domain equalization (SC-FDE) is used for transmission, and different resource elements in different spatial layers (also referred to as "spatial streams") are used to provide reference signals (also referred to as "pilots") for MIMO channel estimation. Such a reference signal, considered in a given spatial layer, can be used as the primary component of the complex envelope of one of the m excitations, and any combination of resource elements which are not used by such a reference signal, considered in a given spatial layer and carrying any data symbols, can be used to obtain the secondary component of the complex envelope of any one of the m excitations. This is because the reference signals meet suitable orthogonality relations. Consequently, this third embodiment is compatible with the requirements of standards typically applicable to MIMO wireless networks.

The specialist understands how the signal processing unit (8) can use the sensing unit output signals obtained for them excitations applied to the user ports, them excitations being bandpass signals having complex envelopes which are the sum of a first complex signal and a second complex signal meeting the requirements of this third embodiment, to estimate q real quantities depending on the impedance matrix presented by the user ports. For instance, let us consider the case where the two sensing unit output signals of any one of said sensing units are proportional to a complex voltage across one of the user ports and to a complex current flowing in said one of the user ports, respectively, and where, for any integer a greater than or equal to 1 and less than or equal to m, the excitation number a consists of a current applied to the user port number a. Based on the explanations about the equation (9), the specialist understands that all entries of $Z_U$ can be determined once the m different excitations have been applied.

For instance, if the sensing units (91) (92) (93) (94) are numbered from 1 to m, we may consider the special case in which, for any integer a greater than or equal to 1 and less than or equal to m, the sensing unit number a delivers: a first sensing unit output signal proportional to the voltage $u_a(t)$ across the user port number a ; and a second sensing unit output signal proportional to the current $i_a(t)$ flowing in the user port number a. In this case, the signal processing unit (8) may for instance perform a down-conversion of all sensing unit output signals, followed by a conversion into digital signals using bandpass sampling, and by a digital quadrature demodulation, to obtain, for any integer a greater than or equal to 1 and less than or equal to m, four digital signals: the samples of the real part of $u_{E\,a}(t)$; the samples of the imaginary part of $u_{E\,a}(t)$; the samples of the real part of $i_{E\,a}(t)$; and the samples of the imaginary part of $i_{E\,a}(t)$. OFDM demodulation may for instance be used to obtain, for any integer a greater than or equal to 1 and less than or equal to m, the samples of the real part of $i_{C\,a}(t)$ and the samples of the imaginary part of $i_{C\,a}(t)$. These digital signals may then be further processed, based on equation (6) and on equation (9) as explained above, to estimate said q real quantities depending on the impedance matrix presented by the user ports, which fully characterize the impedance matrix presented by the user ports.

Fourth embodiment.

The fourth embodiment of a device of the invention, given by way of non-limiting example, also corresponds to the automatically tunable antenna array having m=4 user ports shown in FIG. 1, and all explanations provided for the first embodiment are applicable to this fourth embodiment.

Figure 3:
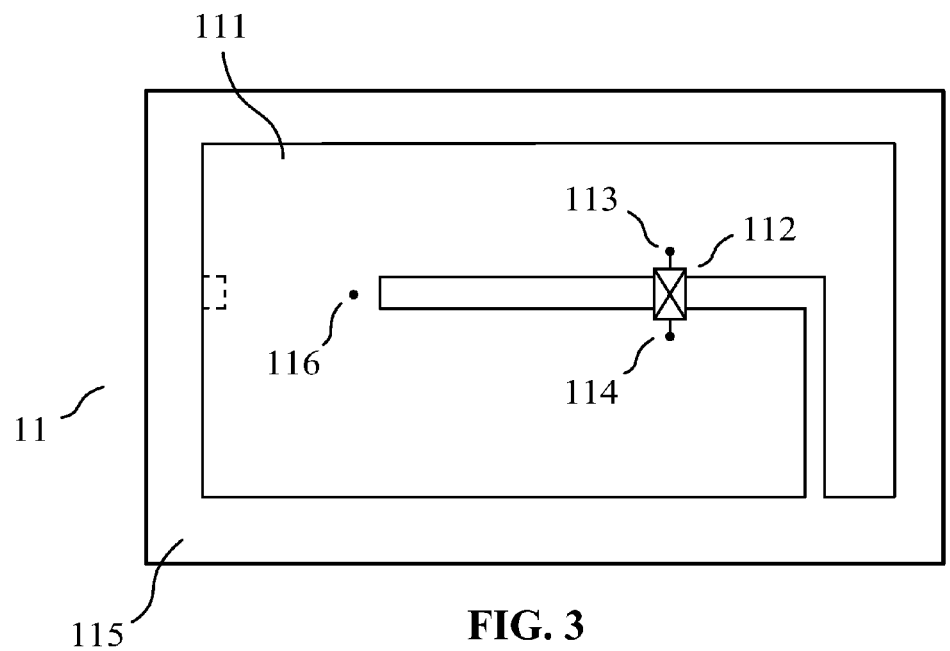
FIG. 3 shows a first tunable passive antenna, which comprises a single antenna control device (fourth embodiment)

A tunable passive antenna (11) used in this fourth embodiment is shown in FIG. 3. The other tunable passive antennas (12) (13) (14) used in this fourth embodiment may be identical to the tunable passive antenna shown in FIG. 3. The tunable passive antenna shown in FIG. 3 comprises a planar metallic structure (111) built above a ground plane (115), a feeder connection point (116) where an unbalanced feeder is connected to the metallic structure, and an antenna control device (112). The metallic structure is slotted and such that, if the antenna control device was not present, the tunable passive antenna would be an example of a planar inverted-F antenna, also referred to as PIFA. The antenna control device is a MEMS switch comprising a first terminal (113) connected to the metallic structure (111) at a first side of the slot, and a second terminal (114) connected to the metallic structure (111) at a second side of the slot. The specialist understands that the self-impedance of the tunable passive antenna, in a given test configuration and at a given frequency, is a characteristic of the tunable passive antenna which may be varied using said antenna control device, so that this characteristic is controlled using said antenna control device. The state of the MEMS switch (on or off) is a parameter of the antenna control device which has an influence on said characteristic. This parameter of the antenna control device is adjustable by electrical means, but the circuits and the control links needed to determine the state of the antenna control device are not shown in FIG. 3.

Fifth Embodiment.

The fifth embodiment of an apparatus of the invention, given by way of non-limiting example, also corresponds to the automatically tunable antenna array having m=4 user ports shown in FIG. 1, and all explanations provided for the first embodiment are applicable to this fifth embodiment.

Figure 4:
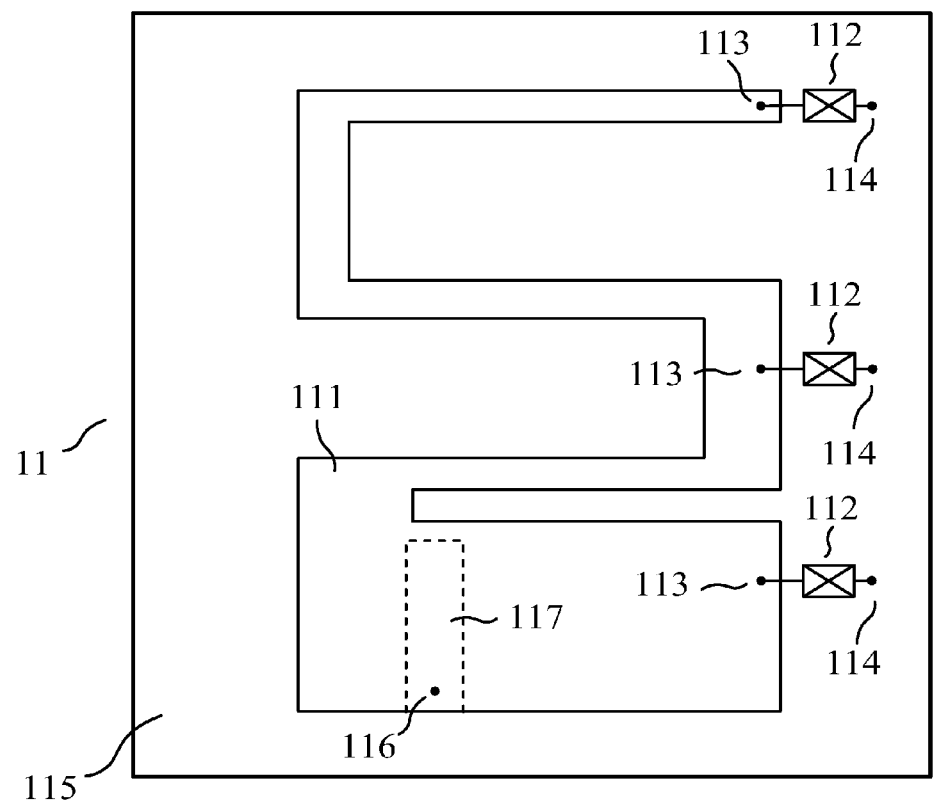
FIG. 4 shows a second tunable passive antenna, which comprises three antenna control devices (fifth embodiment)

A tunable passive antenna (11) used in this fifth embodiment is shown in FIG. 4. The other tunable passive antennas (12) (13) (14) used in this fifth embodiment may be identical to the tunable passive antenna shown in FIG. 3 or to the tunable passive antenna shown in FIG. 4. The tunable passive antenna shown in FIG. 4 comprises a planar metallic structure (111) built above a ground plane (115), a feeder connection point (116) where an unbalanced feeder is connected to a metallic strip (117) lying between the ground plane and the metallic structure, and three antenna control devices (112). Each of the antenna control devices is an adjustable impedance device having a reactance at a given frequency, comprising a first terminal (113) connected to the metallic structure (111), and a second terminal (114) connected to the ground plane (115). The specialist understands that the self-impedance of the tunable passive antenna, in a given test configuration and at the given frequency, is a characteristic of the tunable passive antenna which may be varied using said antenna control devices, so that this characteristic is controlled using said antenna control devices. Each of the antenna control devices has a reactance at the given frequency, this reactance being a parameter of said each of the antenna control devices, this parameter having an influence on said characteristic. This parameter of each of the antenna control devices is adjustable by electrical means, but the circuits and the control links needed to determine the reactance of each of the antenna control devices are not shown in FIG. 4.

Sixth embodiment.

The sixth embodiment of an apparatus of the invention, given by way of non-limiting example, also corresponds to the automatically tunable antenna array having m=4 user ports shown in FIG. 1, and all explanations provided for the first embodiment are applicable to this sixth embodiment.

Figure 5:
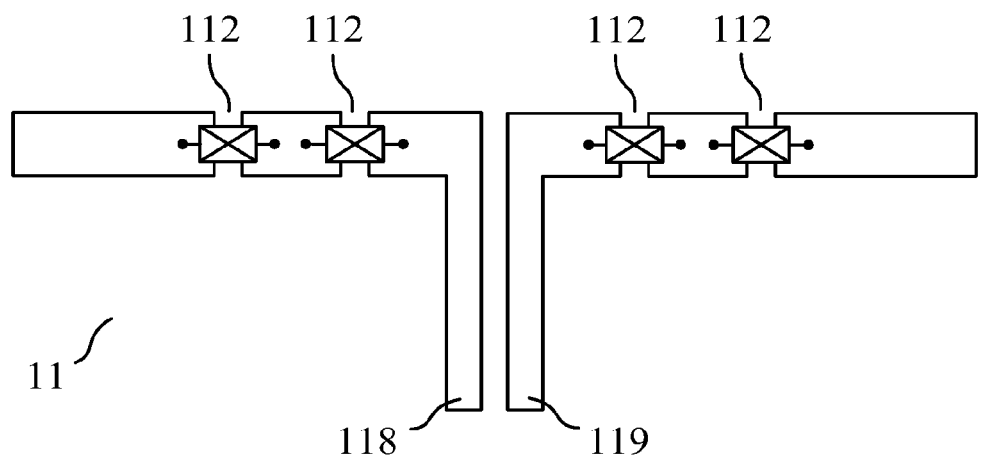
FIG. 5 shows a third tunable passive antenna, which comprises four antenna control devices (sixth embodiment)

A tunable passive antenna (11) used in this sixth embodiment is shown in FIG. 5. The other tunable passive antennas (12) (13) (14) used in this sixth embodiment may be identical to the tunable passive antenna shown in FIG. 3, or to the tunable passive antenna shown in FIG. 4, or to the tunable passive antenna shown in FIG. 5. The tunable passive antenna (11) shown in FIG. 5 has a plane of symmetry orthogonal to the drawing. Thus, the tunable passive antenna has a first half-antenna, on the left in FIG. 5, and a second half-antenna, on the right in FIG. 5. The tunable passive antenna comprises a first terminal (118) where a first conductor of a balanced feeder is connected to the first half-antenna, and a second terminal (119) where a second conductor of the balanced feeder is connected to the second half-antenna. Each half-antenna includes three segments and two antenna control devices (112). Each of the antenna control devices is an adjustable impedance device having a reactance at a given frequency, comprising a first terminal connected to a segment of an half-antenna, and a second terminal connected to another segment of this half-antenna. The specialist understands that the self-impedance of the tunable passive antenna, in a given test configuration and at the given frequency, is a characteristic of the tunable passive antenna which may be varied using said antenna control devices, so that this characteristic is controlled using said antenna control devices. Each of the antenna control devices has a reactance at the given frequency, this reactance being a parameter of said each of the antenna control devices, this parameter having an influence on said characteristic. This parameter of each of the antenna control devices is adjustable by electrical means, but the circuits and the control links needed to determine the reactance of each of the antenna control devices are not shown in FIG. 5.

Seventh embodiment.

The seventh embodiment of an apparatus of the invention, given by way of non-limiting example, also corresponds to the automatically tunable antenna array having m=4 user ports shown in FIG. 1, and all explanations provided for the first embodiment are applicable to this seventh embodiment.

Figure 6:
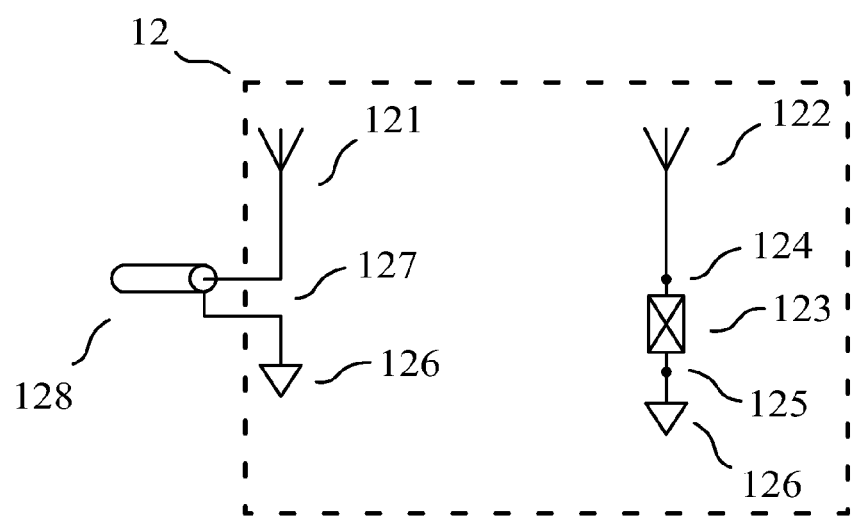
FIG. 6 shows a fourth tunable passive antenna, which comprises a single antenna control device (seventh embodiment)

A tunable passive antenna (12) used in this seventh embodiment is shown in FIG. 6. The other tunable passive antennas (11) (13) (14) used in this seventh embodiment may be identical to the tunable passive antenna shown in FIG. 6. The tunable passive antenna (12) shown in FIG. 6 comprises a main antenna (121), a parasitic antenna (122), a feeder connection point (127) where an unbalanced feeder (128) is connected to the main antenna and to ground (126), and an antenna control device (123). The antenna control device is an adjustable impedance device having a reactance at a given frequency, comprising a first terminal (124) connected to the parasitic antenna (122), and a second terminal (125) connected to ground (126). The specialist understands that the directivity pattern of the tunable passive antenna (12), in a given test configuration and at the given frequency, is a characteristic of the tunable passive antenna which may be varied using said antenna control device, so that this characteristic is controlled using said antenna control device. The reactance of the antenna control device at the given frequency is a parameter of said antenna control device which has an influence on said characteristic. This parameter of the antenna control device is adjustable by electrical means, but the circuits and the control links needed to determine the reactance of the antenna control device are not shown in FIG. 6.

However, the specialist understands that this parameter also has an influence on the self-impedance of the tunable passive antenna, so that the self-impedance of the tunable passive antenna, in a given test configuration and at the given frequency, is also a characteristic of the tunable passive antenna which may be varied using said antenna control device. The tunable passive antenna (12) could also comprise other parasitic antennas each coupled to an antenna control device.

Eighth embodiment.

Figure 7:
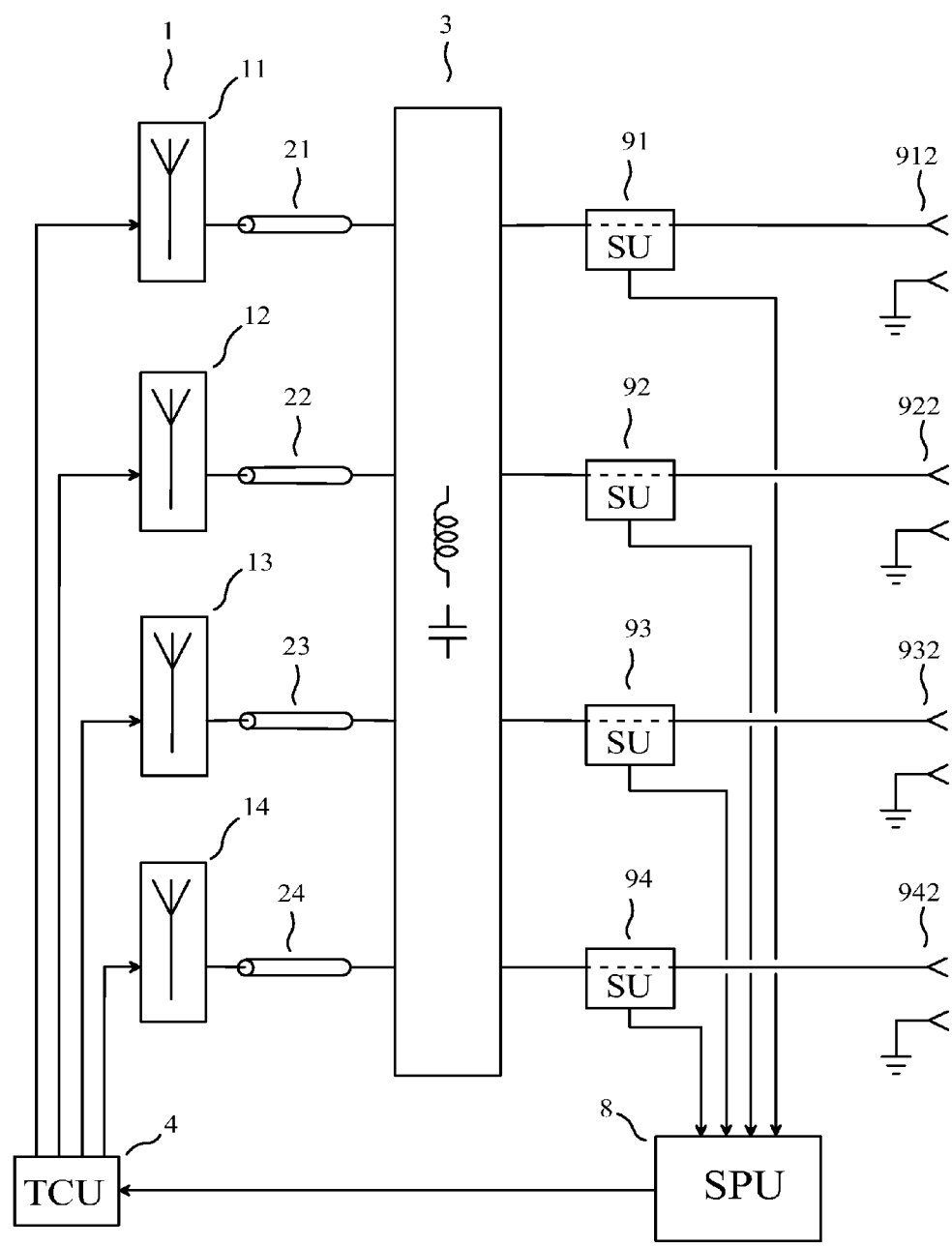
FIG. 7 shows the block diagram of an automatically tunable antenna array of the invention, comprising 4 tunable passive antennas and a multiple-input-port and multiple-output-port matching network (eighth embodiment)

As an eighth embodiment of a device of the invention, given by way of non-limiting example, we have represented in FIG. 7 the block diagram of an automatically tunable antenna array having m=4 user ports (912) (922) (932) (942), the m user ports presenting, at a given frequency greater than or equal to 300 MHz, an impedance matrix referred to as "the impedance matrix presented by the user ports" and denoted by $Z_U$, the automatically tunable antenna array comprising:

n=4 tunable passive antennas (11) (12) (13) (14), then tunable passive antennas operating simultaneously in a given frequency band, the n tunable passive antennas forming a multiport antenna array (1), each of the tunable passive antennas comprising at least one antenna control device, said at least one antenna control device having at least one parameter having an effect on one or more characteristics of said each of the tunable passive antennas, said at least one parameter being adjustable by electrical means;

m sensing units (91) (92) (93) (94), each of the sensing units delivering two "sensing unit output signals", each of the sensing unit output signals being determined by one electrical variable measured at one of the user ports;

a multiple-input-port and multiple-output-port network (3) having m input ports and n output ports, each of the m input ports being coupled to one and only one of the user ports, through one and only one of the sensing units;

n feeders (21) (22) (23) (24), each of the feeders having a first end coupled to a signal port of one and only one of the tunable passive antennas, each of the feeders having a second end coupled to one and only one of the n output ports;

a signal processing unit (8), the signal processing unit estimating q real quantities depending on the impedance matrix presented by the user ports, where q is an integer greater than or equal to m, using the sensing unit output signals obtained for m excitations applied by an external device to the user ports (the external device is not shown in FIG. 7), one and only one of the excitations being applied to each user ports, the excitations being not applied successively, the signal processing unit delivering a "tuning instruction" as a function of said q real quantities depending on the impedance matrix presented by the user ports; and a tuning control unit (4), the tuning control unit receiving the tuning instruction from the signal processing unit (8), the tuning control unit delivering "tuning control signals" to the tunable passive antennas (11) (12) (13) (14), the tuning control signals being determined as a function of the tuning instruction, each of said parameters being mainly determined by one or more of the tuning control signals.

The multiple-input-port and multiple-output-port network (3) is a circuit which behaves, at the given frequency, with respect to its input ports and output ports, substantially as a passive linear device, where "passive" is used in the meaning of circuit theory. More precisely, the multiple-input-port and multiple-output-port network behaves, at the given frequency, with respect to the n output ports and the m input ports, substantially as a passive linear (n+m)-port device. As a consequence of linearity, it is possible to define the impedance matrix presented by the input ports. As a consequence of passivity, the multiple-input-port and multiple-output-port network does not provide amplification.

The multiple-input-port and multiple-output-port network (3) allows, at the given frequency, transfers of power from its input ports to its output ports and from its output ports to its input ports, these transfers of power being ideally lossless, or nearly lossless. A suitable multiple-input-port and multiple-output-port network may be such that it is not composed of a plurality of independent and uncoupled single-input-port and single-output-port networks. Conversely, in the case n=m, a suitable multiple-input-port and multiple-output-port network may be such that it is composed of m independent and uncoupled single-input-port and single-output-port networks.

The multiple-input-port and multiple-output-port network is such that, at the given frequency, an impedance matrix presented by the input ports (the sensing units are such that this impedance matrix is close to $Z_U$) is different from an impedance matrix seen by the output ports. Thus, the multiple-input-port and multiple-output-port network contributes to the design goal of this eighth embodiment: being able to obtain, at any frequency in a specified frequency interval, a tuning instruction such that an impedance matrix presented by the user ports approximates a wanted impedance matrix $Z_W$, the wanted impedance matrix being a diagonal matrix. For this reason, the multiple-input-port and multiple-output-port network may be regarded as a matching network, or as a matching and decoupling network, and it may for instance be referred to as "multiple-input-port and multiple-output-port matching network".

The specialist understands that each of the n tunable passive antennas is coupled, through one of the feeders, the multiple-input-port and multiple-output-port network and one or more sensing units, to one or more of the user ports. Consequently, each of the n tunable passive antennas is coupled, indirectly, to one or more of the user ports. As shown in FIG. 7, it is possible to consider that each of the sensing units includes: a first port connected to one of said input ports; and a second port which is one of the user ports.

The tuning instruction may be of any type of digital message. In this eighth embodiment, an adaptive process is carried out by the signal processing unit, during one or more tuning sequences. The adaptive process is the following: during each of said tuning sequences, the signal processing unit estimates the q real quantities depending on the impedance matrix presented by the user ports, and uses a lookup table (also spelled "look-up table") to determine the tuning instruction, based on the frequency of operation, on the q real quantities depending on the impedance matrix presented by the user ports, and on the tuning instruction which was applicable while the sensing units were delivering the sensing unit output signals used to estimate the q real quantities depending on the impedance matrix presented by the user ports. The specialist understands how to build and use such a lookup table. The lookup table is such that the adjustment of the tunable passive antennas is always optimal or almost optimal.

In this eighth embodiment, each of the antenna control devices is an adjustable impedance device providing an adjustable reactance. The reactance of an adjustable impedance device may depend on the ambient temperature, for some types of adjustable impedance devices. If such a type of adjustable impedance device is used in the tunable passive antennas, it is possible that the tuning control signals are determined as a function of the tuning instruction and as a function of one or more temperatures, to compensate the effect of temperature on the reactance of each of the adjustable impedance devices of the tunable passive antennas. If such a type of adjustable impedance device is used in the tunable passive antennas, it is also possible that one or more temperatures are taken into account to obtain the tuning instruction, to compensate the effect of temperature on the reactance of each of the adjustable impedance devices of the tunable passive antennas. In this case, the signal processing unit delivers a tuning instruction as a function of said q real quantities depending on the impedance matrix presented by the user ports, and as a function of said one or more temperatures.

In order to respond to variations in the electromagnetic characteristics of the volume surrounding the antennas and/or in said one or more temperatures, the tuning instruction may be generated repeatedly. For instance, a new tuning sequence ending with the delivery of a new tuning instruction may start periodically, for instance every 10 milliseconds.

Figure 8:
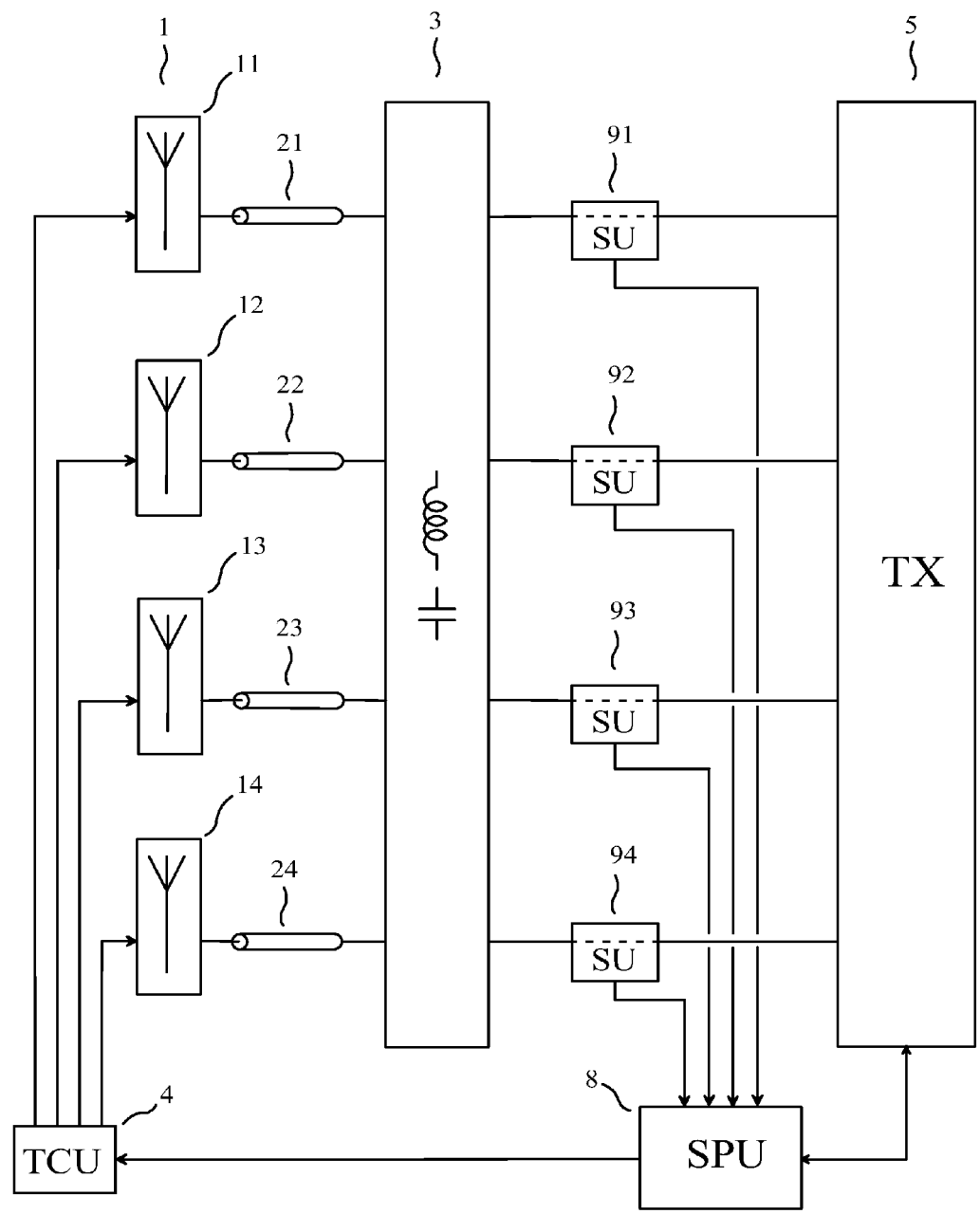
FIG. 8 shows the block diagram of a transmitter for radio communication using the automatically tunable antenna array shown in FIG. 7 (eighth embodiment)

As an example, FIG. 8 shows the block diagram of a transmitter for radio communication (or of a transceiver for radio communication) using the automatically tunable antenna array shown in FIG. 7. The transmitter for radio communication (or transceiver for radio communication) shown in FIG. 8 comprises:

the tunable passive antennas (11) (12) (13) (14) forming a multiport antenna array (1) of FIG. 7;
the sensing units (91) (92) (93) (94) of FIG. 7;
the multiple-input-port and multiple-output-port network (3) of FIG. 7;
the feeders (21) (22) (23) (24) of FIG. 7;
the signal processing unit (8) of FIG. 7;
the tuning control unit (4) of FIG. 7; and
a radio device (5) which consists of all parts of the transmitter (or transceiver) which are not shown elsewhere in FIG. 8, the radio device having m=4 radio ports, the radio device delivering "tuning sequence instructions" which indicate when a tuning sequence is being performed, m excitations being delivered by the radio ports during said tuning sequence, one and only one of the excitations being delivered by each of the radio ports.

In FIG. 8, each of the input ports of the multiple-input-port and multiple-output-port network (3) is coupled to one and only one of the radio ports, through one and only one of the sensing units. The m radio ports see, at the given frequency, an impedance matrix referred to as "the impedance matrix seen by the radio ports", which clearly may be considered as being the impedance matrix presented by the user ports and denoted by $Z_U$.

The radio device (5) performs functions which were, in the explanations provided above about FIG. 7, assigned to the external device. The tuning sequence instructions are delivered to the signal processing unit (8). Additionally, the radio device provides other signals to the signal processing unit, and/or receives other signals from the signal processing unit.

Ninth embodiment.

Figure 9:
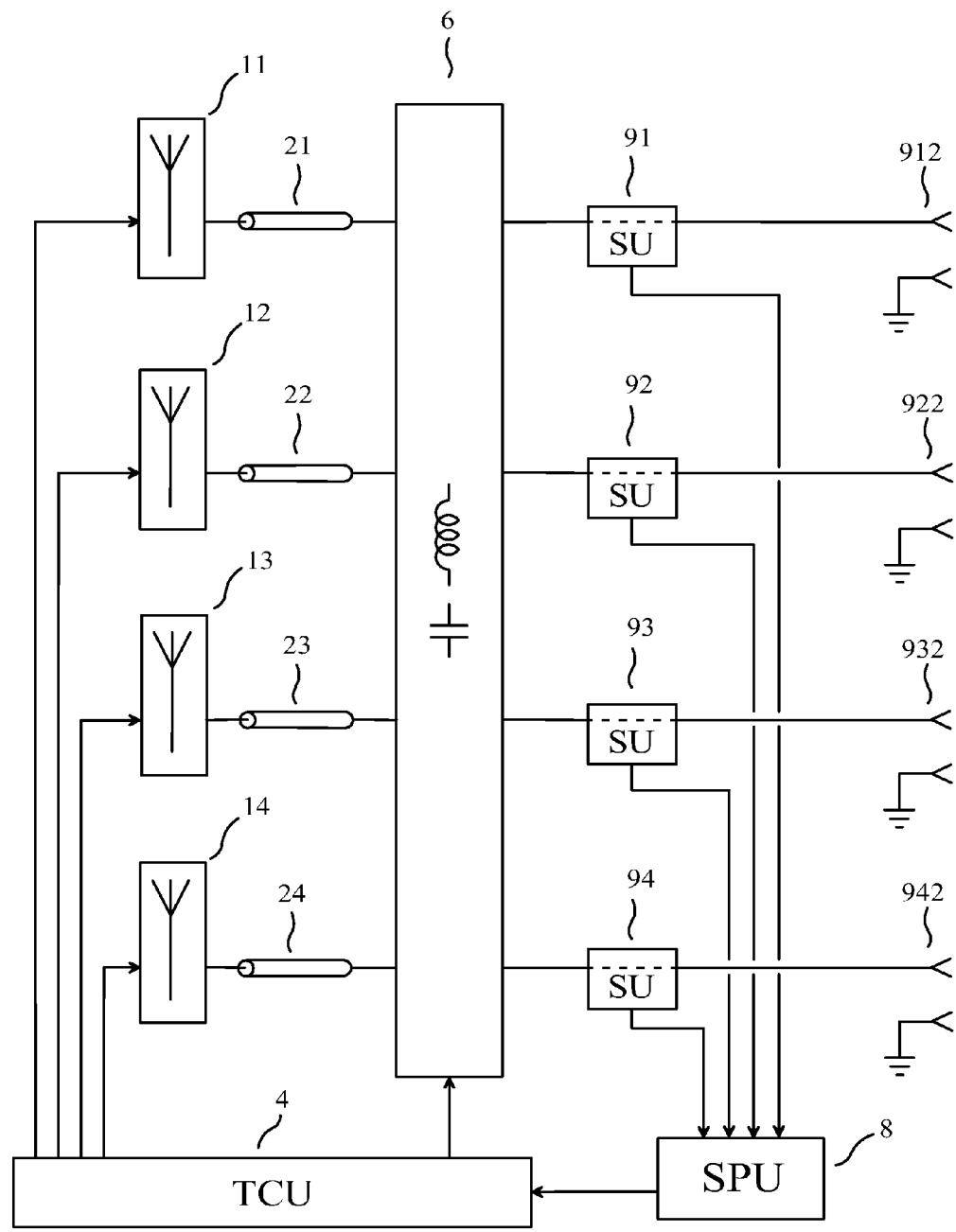
FIG. 9 shows the block diagram of an automatically tunable antenna array of the invention, comprising 4 tunable passive antennas and a multiple-input-port and multiple-output-port tuning unit (ninth embodiment)

As a ninth embodiment of a device of the invention, given by way of non-limiting example, we have represented in FIG. 9 the block diagram of an automatically tunable antenna array having m=4 user ports (912) (922) (932) (942), the m user ports presenting, at a given frequency greater than or equal to 30 MHz, an impedance matrix referred to as "the impedance matrix presented by the user ports" and denoted by $Z_U$, the automatically tunable antenna array comprising:

n=4 tunable passive antennas (11) (12) (13) (14), each of the tunable passive antennas comprising at least one antenna control device having at least one parameter having an effect on one or more characteristics of said each of the tunable passive antennas, said at least one parameter being adjustable by electrical means;

m sensing units (91) (92) (93) (94), each of the sensing units delivering one or more "sensing unit output signals", each of the sensing unit output signals being determined by one electrical variable measured (or sensed) at one of the user ports;

a multiple-input-port and multiple-output-port tuning unit (6) having m input ports and n output ports, each of the m input ports being coupled to one and only one of the user ports through one and only one of the sensing units, the multiple-input-port and multiple-output-port tuning unit comprising p adjustable impedance devices, where p is an integer greater than or equal to m, the p adjustable impedance devices being referred to as "the adjustable impedance devices of the tuning unit" and being such that, at said given frequency, each of the adjustable impedance devices of the tuning unit has a reactance, the reactance of any one of the adjustable impedance devices of the tuning unit having an influence on the impedance matrix presented by the user ports, the reactance of any one of the adjustable impedance devices of the tuning unit being adjustable by electrical means;

n feeders (21) (22) (23) (24), each of the feeders having a first end coupled to a signal port of one and only one of the tunable passive antennas, each of the feeders having a second end coupled to one and only one of the n output ports;

a signal processing unit (8), the signal processing unit estimating q real quantities depending on the impedance matrix presented by the user ports, where q is an integer greater than or equal to m, using the sensing unit output signals obtained for m excitations applied by an external device to the user ports (the external device is not shown in FIG. 9), one and only one of the excitations being applied to each user ports, the excitations being not applied successively, each of the excitations being a bandpass signal, the signal processing unit delivering a "tuning instruction" as a function of said q real quantities depending on the impedance matrix presented by the user ports; and a tuning control unit (4), the tuning control unit receiving the tuning instruction from the signal processing unit (8), the tuning control unit delivering "tuning control signals" to the tunable passive antennas (11) (12) (13) (14) and to the multiple-input-port and multiple-output-port tuning unit (6), the tuning control signals being determined as a function of the tuning instruction, each of said parameters being mainly determined by one or more of the tuning control signals, the reactance of each of the adjustable impedance devices of the tuning unit being mainly determined by one or more of the tuning control signals.

The multiple-input-port and multiple-output-port tuning unit (6) behaves, at the given frequency, with respect to its input ports and output ports, substantially as a passive linear device, where "passive" is used in the meaning of circuit theory. More precisely, the multiple-input-port and multiple-output-port tuning unit behaves, at the given frequency, with respect to the n output ports and the m input ports, substantially as a passive linear (n+m)-port device. As a consequence of linearity, it is possible to define the impedance matrix presented by the input ports. As a consequence of passivity, the multiple-input-port and multiple-output-port tuning unit does not provide amplification.

The multiple-input-port and multiple-output-port tuning unit (6) allows, at the given frequency, transfers of power from its input ports to its output ports and from its output ports to its input ports, these transfers of power being ideally lossless, or nearly lossless.

As said above, the reactance of an adjustable impedance device may depend on the ambient temperature, for some types of adjustable impedance devices. If such a type of adjustable impedance device is used in the multiple-input-port and multiple-output-port tuning unit, it is possible that the tuning control signals are determined as a function of the tuning instruction and as a function of one or more temperatures, to compensate the effect of temperature on the reactance of each of the adjustable impedance devices of the tuning unit. If such a type of adjustable impedance device is used in the multiple-input-port and multiple-output-port tuning unit, it is also possible that one or more temperatures are taken into account to obtain the tuning instruction, to compensate the effect of temperature on the reactance of each of the adjustable impedance devices of the tuning unit. In this case, the signal processing unit delivers the tuning instruction as a function of said q real quantities depending on the impedance matrix presented by the user ports, and as a function of said one or more temperatures.

As shown in FIG. 9, it is possible to consider that each of the sensing units (91) (92) (93) (94) includes: a first port connected to one of said input ports; and a second port which is one of the user ports (912) (922) (932) (942).

In this ninth embodiment, the antenna control devices are MEMS switches, and the tunable passive antennas are used to obtain a coarse adjustment of $Z_U$, whereas the multiple-input-port and multiple-output-port tuning unit is used to obtain a fine adjustment of $Z_U$.

Figure 10:
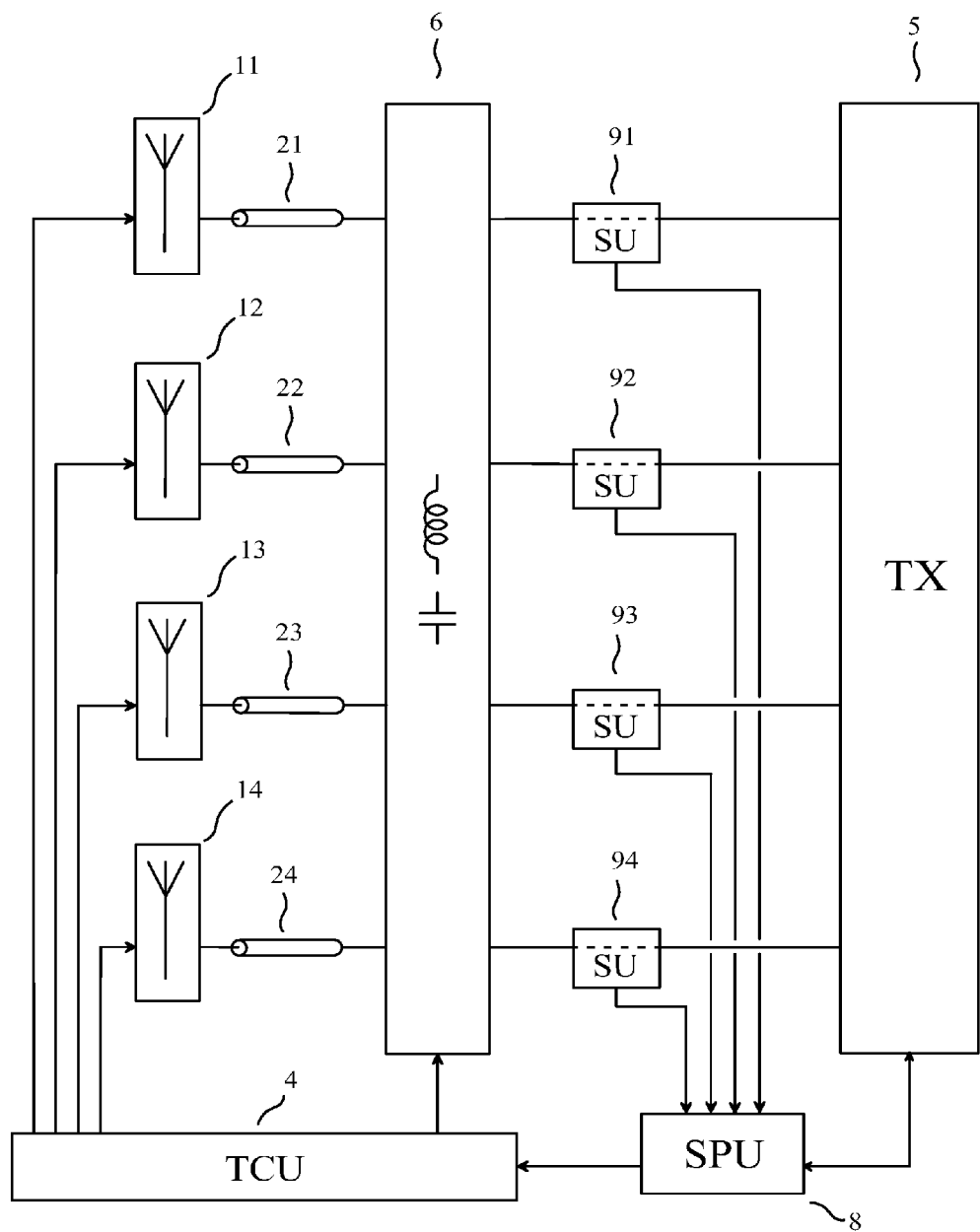
FIG. 10 shows the block diagram of a transmitter for radio communication using the automatically tunable antenna array shown in FIG. 9 (ninth embodiment)

As an example, FIG. 10 shows the block diagram of a transmitter for radio communication (or of a transceiver for radio communication) using the automatically tunable antenna array shown in FIG. 9. The transmitter for radio communication (or transceiver for radio communication) shown in FIG. 10 comprises:

the tunable passive antennas (11) (12) (13) (14) of FIG. 9;
the sensing units (91) (92) (93) (94) of FIG. 9;
the multiple-input-port and multiple-output-port tuning unit (6) of FIG. 9;
the feeders (21) (22) (23) (24) of FIG. 9;
the signal processing unit (8) of FIG. 9;
the tuning control unit (4) of FIG. 9; and
a radio device (5) which consists of all parts of the transmitter (or transceiver) which are not shown elsewhere in FIG. 10, the radio device having m=4 radio ports, the radio device delivering "tuning sequence instructions" which indicate when a tuning sequence is being performed, m excitations being delivered by the radio ports during said tuning sequence, one and only one of the excitations being delivered by each of the radio ports.

In FIG. 10, each of the input ports of the multiple-input-port and multiple-output-port tuning unit (6) is coupled to one and only one of the radio ports, through one and only one of the sensing units. The m radio ports see, at the given frequency, an impedance matrix referred to as "the impedance matrix seen by the radio ports", which clearly may be considered as being the impedance matrix presented by the user ports and denoted by $Z_U$.

The radio device (5) performs functions which were, in the explanations provided above about FIG. 9, assigned to the external device. The tuning sequence instructions are delivered to the signal processing unit (8). Additionally, the radio device provides other signals to the signal processing unit, and/or receives other signals from the signal processing unit.

During a tuning sequence, each of the radio ports presents a known impedance and the short-circuit current of the Norton equivalent circuit of each of the radio ports is also known. Thus, the specialist understands that the measurement of complex voltages at the radio ports is sufficient to derive all entries of $Z_U$. Consequently, each of the sensing units (91) (92) (93) (94) may for instance deliver a single sensing unit output signal proportional to an electrical variable, the electrical variable being a voltage across one of the radio ports, or equivalently a voltage across one of the user ports.

Tenth embodiment.

The tenth embodiment of a device of the invention, given by way of non-limiting example, also corresponds to the automatically tunable antenna array having m=4 user ports (912) (922) (932) (942) shown in FIG. 9, and all explanations provided for the ninth embodiment are applicable to this tenth embodiment.

In this tenth embodiment, n=m, and the multiple-input-port and multiple-output-port tuning unit is composed of m single-input-port and single-output-port tuning units, each comprising one or more of said adjustable impedance devices of the tuning unit, or two or more of said adjustable impedance devices of the tuning unit, these single-input-port and single-output-port tuning units being independent and uncoupled. Such a multiple-input-port and multiple-output-port tuning unit is for instance considered in the section III of the article of F. Broydé and E. Clavelier entitled "Two Multiple-Antenna-Port and Multiple-User-Port Antenna Tuners", published in *Proc. 9th European Conference on Antenna and Propagation, EuCAP* 2015, in April 2015.

The specialist understands that each of the n tunable passive antennas is coupled, through one of the feeders, the multiple-input-port and multiple-output-port tuning unit and one and only one sensing unit, to one and only one of the user ports. Consequently, each of the n tunable passive antennas is coupled, indirectly, to one and only one of the user ports.

In this tenth embodiment, an adaptive process is implemented by the signal processing unit, during one or more tuning sequences. The adaptive process is the following: during each of said tuning sequences, the signal processing unit estimates a norm of the matrix of the voltage reflection coefficients at the user ports, for a finite set of tuning instructions, and a tuning instruction producing the smallest norm is selected. The specialist understands that this adaptive process is easier to implement in the case where each of the sensing units is such that the two sensing unit output signals delivered by said each of the sensing units comprise: a first sensing unit output signal proportional to an incident voltage at one of the user ports; and a second sensing unit output signal proportional to a reflected voltage at said one of the user ports.

Eleventh embodiment.

The eleventh embodiment of a device of the invention, given by way of non-limiting example, also corresponds to the automatically tunable antenna array having m=4 user ports (912) (922) (932) (942) shown in FIG. 9, and all explanations provided for the ninth embodiment are applicable to this eleventh embodiment.

In this eleventh embodiment, the multiple-input-port and multiple-output-port tuning unit (6) is not composed of m independent and uncoupled single-input-port and single-output-port tuning units, each comprising one or more of said adjustable impedance devices of the tuning unit.

More precisely, the multiple-input-port and multiple-output-port tuning unit is an antenna tuning apparatus disclosed in the French patent application No. 12/02542 and in the international application PCT/IB2013/058423, and explained in: the article of F. Broydé and E. Clavelier, entitled "A New Multiple-Antenna-Port and Multiple-User-Port Antenna Tuner", published in *Proc.* 2015 *IEEE Radio & Wireless Week, RWW* 2015, at the pages 41 to 43, in January 2015; the article of F. Broydé and E. Clavelier entitled "Some Properties of Multiple-Antenna-Port and Multiple-User-Port Antenna Tuners", published in *IEEE Trans. on Circuits and Systems—I: Regular Papers*, Vol. 62, No. 2, pp. 423-432, in February 2015; and in said article of F. Broydé and E. Clavelier entitled "Two Multiple-Antenna-Port and Multiple-User-Port Antenna Tuners". Thus, the multiple-input-port and multiple-output-port tuning unit is such that the reactance of any one of the adjustable impedance devices of the tuning unit has, at said given frequency, if the impedance matrix seen by the output ports is equal to a given diagonal impedance matrix, an influence on the impedance matrix presented by the input ports, and such that the reactance of at least one of the adjustable impedance devices of the tuning unit has, at said given frequency, if the impedance matrix seen by the output ports is equal to the given diagonal impedance matrix, an influence on at least one non-diagonal entry of the impedance matrix presented by the input ports. This must be interpreted as meaning: the multiple-input-port and multiple-output-port tuning unit is such that, at said given frequency, there exists a diagonal impedance matrix referred to as the given diagonal impedance matrix, the given diagonal impedance matrix being such that, if an impedance matrix seen by the output ports is equal to the given diagonal impedance matrix, then (a) the reactance of any one of the adjustable impedance devices of the tuning unit has an influence on an impedance matrix presented by the input ports, and (b) the reactance of at least one of the adjustable impedance devices of the tuning unit has an influence on at least one non-diagonal entry of the impedance matrix presented by the input ports.

The specialist understands that each of the n tunable passive antennas is coupled, through one of the feeders, the multiple-input-port and multiple-output-port tuning unit and one or more sensing units, to one or more of the user ports, and that at least one of the n tunable passive antennas is coupled, through one of the feeders, the multiple-input-port and multiple-output-port tuning unit and two or more sensing units, to two or more of the user ports. Consequently, each of the n tunable passive antennas is coupled, indirectly, to one or more of the user ports, and at least one of the n tunable passive antennas is coupled, indirectly, to two or more of the user ports.

In this eleventh embodiment, an adaptive process is implemented by the signal processing unit, during one or more tuning sequences. A first possible adaptive process is the following: during each of said tuning sequences, the signal processing unit estimates the real part and the imaginary part of the $m^2$ entries of $Z_U$, which are $q=2m^2$ real quantities depending on the impedance matrix presented by the user ports; the signal processing unit computes the real part and the imaginary part of the $m^2$ entries of the admittance matrix presented by the user ports, which is equal to $Z_U^{-1}$; and the signal processing unit determines a tuning instruction such that a norm of the image of this admittance matrix, computed as said above, under a matrix function is reduced (so that we can also say that a norm of the image of $Z_U$ under a matrix function is reduced). A second possible adaptive process is the following: during each of said tuning sequences, the signal processing unit estimates the real part and the imaginary part of the $m^2$ entries of the admittance matrix presented by the user ports, which are $q=2m^2$ real quantities depending on the impedance matrix presented by the user ports; and the signal processing unit determines a tuning instruction such that a norm of the image of this admittance matrix, estimated as said above, under a matrix function is reduced (so that we can also say that a norm of the image of $Z_U$ under a matrix function is reduced). A third possible adaptive process is the following: during each of said tuning sequences, the signal processing unit estimates the real part and the imaginary part of the $m^2$ entries of the admittance matrix presented by the user ports ; and the signal processing unit determines a tuning instruction such that the admittance matrix presented by the user ports is substantially equal to a wanted admittance matrix equal to the inverse of $Z_W$.

The specialist understands that, in many possible applications, the impedance matrix seen by the output ports is a symmetric matrix, so that the impedance matrix presented by the user ports and the admittance matrix presented by the user ports are symmetric matrices which are each fully defined by m (m+1) real quantities. Thus, only m (m+1) real quantities depending on the impedance matrix presented by the user ports are needed to fully define the impedance matrix presented by the user ports and the admittance matrix presented by the user ports. The specialist understands how the three possible adaptive processes defined above can use this property and/or be modified to take advantage of this property.

Twelfth embodiment.

The twelfth embodiment of a device of the invention, given by way of non-limiting example, also corresponds to the automatically tunable antenna array having m=4 user ports (912) (922) (932) (942) shown in FIG. 9, and all explanations provided for the ninth embodiment are applicable to this twelfth embodiment. Additionally, in this twelfth embodiment, the signal processing unit (8) delivers the "tuning instruction" as a function of said q real quantities depending on the impedance matrix presented by the user ports, and as a function of one or more localization variables, each of the localization variables depending on the distance between a part of a human body and a zone of a transmitter for radio communication in which the automatically tunable antenna array is built and used.

It is said above that each of the localization variables depends on the distance between a part of a human body and a zone of the transmitter for radio communication. This must be interpreted as meaning: each of the localization variables is such that there exists at least one configuration in which the distance between a part of a human body and a zone of the transmitter for radio communication has an effect on said each of the localization variables.

For instance, a "localization sensor unit" may estimate one or more localization variables each depending, in a given use configuration, on the distance between a part of a human body and a zone of the transmitter for radio communication. The localization sensor unit may comprise a plurality of localization sensors. Each of said zones may be a part of the space occupied by the corresponding localization sensor, this space being inside the space occupied by the transmitter for radio communication, so that in this case each of said zones has a volume much less than the volume of the transmitter for radio communication. For each of the antennas, at least one of the localization variables may depend on the distance between a part of a human body and a small zone near said each of the antennas. If a suitable localization sensor is used, said zone may be a point, or substantially a point.

For instance, at least one of the localization variables may be an output of a localization sensor responsive to a pressure exerted by a part of a human body. For instance, at least one of the localization variables may be an output of a proximity sensor.

The localization sensor unit assesses (or equivalently, estimates) a plurality of localization variables each depending, in a given use configuration, on the distance between a part of a human body and a zone of the transmitter for radio communication. However, it is possible that one or more other localization variables each depending, in a given use configuration, on the distance between a part of a human body and a zone of the transmitter for radio communication, are not estimated by the localization sensor unit. For instance, at least one of the localization variables may be determined by a change of state of an output of a touch-screen. Thus, the localization sensor unit may be regarded as a part of a localization unit which estimates (or evaluates) a plurality of variables, each of said variables being referred to as "localization variable", each of the localization variables depending on the distance between a part of a human body and a zone of the transmitter for radio communication. This part of the localization unit may be the whole localization unit.

This twelfth embodiment may possibly use some aspects of the technique disclosed in the French patent application No. 14/00606 of 13 Mar. 2014 entitled "Communication radio utilisant des antennes multiples et des variables de localisation", corresponding to the international application No. PCT/IB2015/051548 of 3 Mar. 2015 entitled "Radio communication using multiple antennas and localization variables".

Thirteenth embodiment.

Figure 11:
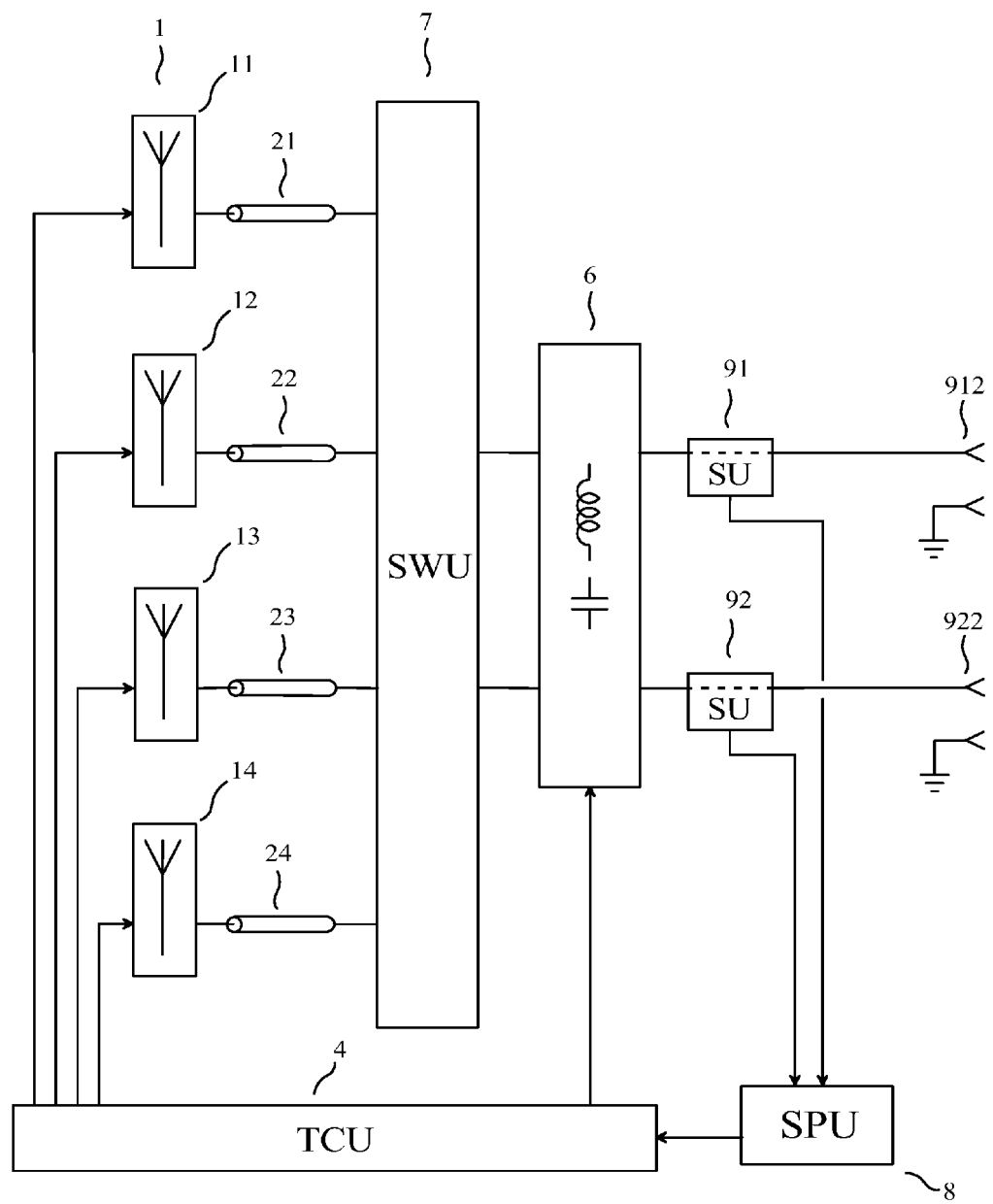
FIG. 11 shows the block diagram of an automatically tunable antenna array of the invention, comprising 4 tunable passive antennas and a switching unit (thirteenth embodiment)

As a thirteenth embodiment of a device of the invention, given by way of non-limiting example, we have represented in FIG. 11 the block diagram of an automatically tunable antenna array having m=2 user ports (912) (922), the m user ports presenting, at a given frequency greater than or equal to 300 MHz, an impedance matrix referred to as "the impedance matrix presented by the user ports" and denoted by $Z_U$, the automatically tunable antenna array comprising:
  n=4 tunable passive antennas (11) (12) (13) (14), the n tunable passive antennas forming a multiport antenna array (1), each of the tunable passive antennas comprising at least one antenna control device, said at least one antenna control device having at least one parameter having an effect on one or more characteristics of said each of the tunable passive antennas, said at least one parameter being adjustable by electrical means;
  a switching unit (7), the switching unit receiving a "configuration instruction" delivered by an external device (the external device is not shown in FIG. 11), the switching unit comprising n antenna ports each coupled to one and only one of the tunable passive antennas through a feeder (21) (22) (23) (24), the switching unit comprising N=2 array ports, the switching unit operating in an active configuration determined by the configuration instruction, the active configuration being one of a plurality of allowed configurations, the switching unit providing, in any one of the allowed configurations, for signals in a given frequency band and for any one of the array ports, a bidirectional path between said any one of the array ports and one and only one of the antenna ports;

m sensing units (91) (92), each of the sensing units delivering two or more "sensing unit output signals", each of the sensing unit output signals being determined by one electrical variable;

a multiple-input-port and multiple-output-port tuning unit (6) having m input ports and N output ports, each of the m input ports being coupled to one and only one of the user ports through one and only one of the sensing units, each of the N output ports being coupled to one and only one of the array ports, the multiple-input-port and multiple-output-port tuning unit comprising p adjustable impedance devices, where p is an integer greater than or equal to m, the p adjustable impedance devices being referred to as "the adjustable impedance devices of the tuning unit" and being such that, at said given frequency, each of the adjustable impedance devices of the tuning unit has a reactance, the reactance of any one of the adjustable impedance devices of the tuning unit having an influence on the impedance matrix presented by the user ports, the reactance of any one of the adjustable impedance devices of the tuning unit being adjustable by electrical means;

a signal processing unit (8), the signal processing unit estimating q real quantities depending on the impedance matrix presented by the user ports, where q is an integer greater than or equal to m, using the sensing unit output signals obtained for m excitations applied by said external device to the user ports, one and only one of the excitations being applied to each user ports, the excitations being not applied successively, each of the excitations being a bandpass signal, the signal processing unit delivering a "tuning instruction" as a function of said q real quantities depending on the impedance matrix presented by the user ports; and a tuning control unit (4), the tuning control unit receiving the tuning instruction from the signal processing unit (8), the tuning control unit delivering "tuning control signals" to the tunable passive antennas (11) (12) (13) (14) and to the multiple-input-port and multiple-output-port tuning unit (6), the tuning control signals being determined as a function of the tuning instruction, each of said parameters being mainly determined by one or more of the tuning control signals, the reactance of each of the adjustable impedance devices of the tuning unit being mainly determined by one or more of the tuning control signals.

The switching unit operates (or is used) in an active configuration determined by the configuration instruction, the active configuration being one of a plurality of allowed configurations, the switching unit providing, in any one of the allowed configurations, for signals in the given frequency band and for any one of the array ports, a path between said any one of the array ports and one of the antenna ports. Thus, the switching unit operates in an active configuration which is one of the allowed configurations, and each allowed configuration corresponds to a selection of N antenna ports among the n antenna ports. It is also possible to say that the switching unit operates in an active configuration corresponding to a selection of N antenna ports among the n antenna ports.

Each allowed configuration corresponds to a selection of N antenna ports among the n antenna ports, the switching unit providing, for signals in the given frequency band and for any one of the array ports, a path between said any one of the array ports and one of the selected antenna ports. This path may preferably be a low loss path for signals in the given frequency band. The specialist understands that a suitable switching unit may comprise one or more electrically controlled switches and/or change-over switches (here, "electrically controlled" means "controlled by electrical means"). In this case, one or more of said electrically controlled switches and/or change-over switches may for instance be an electro-mechanical relay, or a microelectromechanical switch, or a circuit using one or more PIN diodes and/or one or more insulated-gate field-effect transistors as switching devices.

In this embodiment, it is not possible to say that, for each of the n tunable passive antennas, the signal port of the antenna is coupled, directly or indirectly, to one and only one of the user ports. However, in this embodiment, for each of the m user ports, the user port is indirectly coupled to one and only one of the n tunable passive antennas.

For instance, the configuration instruction may be determined as a function of:

one or more localization variables defined as in the twelfth embodiment;

the frequencies used for radio communication with the tunable passive antennas;

one or more additional variables, each of the additional variables lying in a set of additional variables, the elements of the set of additional variables comprising: communication type variables which indicate whether a radio communication session is a voice communication session, a data communication session or another type of communication session; a speakerphone mode activation indicator; a speaker activation indicator; variables obtained using one or more accelerometers; user identity variables which depend on the identity of the current user; reception quality variables; and emission quality variables.

The elements of said set of additional variables may further comprise one or more variables which are different from the localization variables and which characterize the grip with which a user is holding the transmitter for radio communication.

The configuration instruction may for instance be determined using a lookup table.

In order to respond to variations in the electromagnetic characteristics of the volume surrounding the antennas, the configuration instruction and/or the tuning instruction and/or the tuning control signals may be generated repeatedly and delivered repeatedly, for instance every 10 milliseconds.

Figure 12:
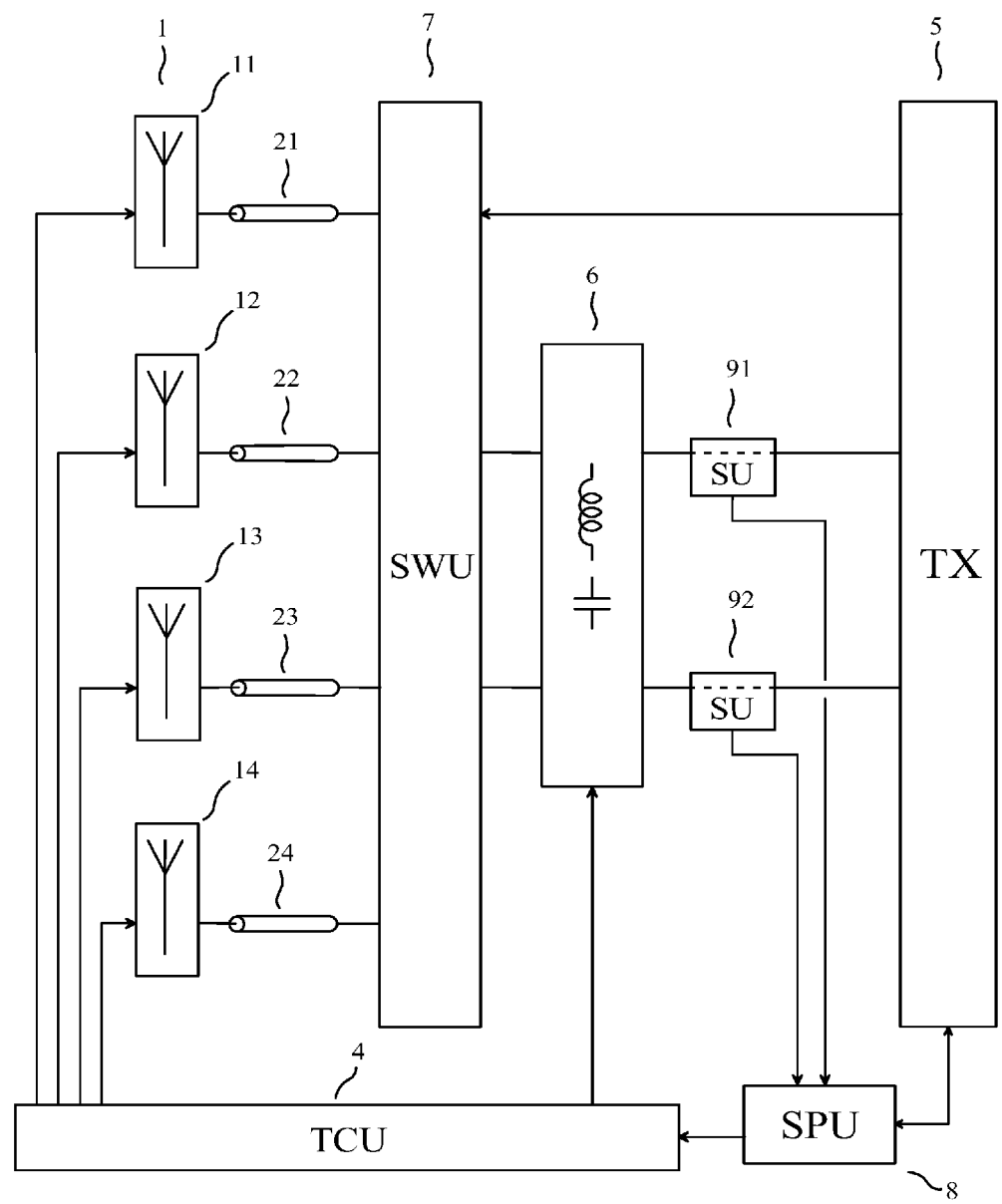
FIG. 12 shows the block diagram of a transmitter for radio communication using the automatically tunable antenna array shown in FIG. 11 (thirteenth embodiment).

As an example, FIG. 12 shows the block diagram of a transmitter for radio communication (or of a transceiver for radio communication) using the automatically tunable antenna array shown in FIG. 11. The transmitter for radio communication (or transceiver for radio communication) shown in FIG. 12 comprises:

the tunable passive antennas (11) (12) (13) (14) forming a multiport antenna array (1) of FIG. 11;

the switching unit (7) of FIG. 11;

the feeders (21) (22) (23) (24) of FIG. 11;

the sensing units (91) (92) of FIG. 11;

the multiple-input-port and multiple-output-port tuning unit (6) of FIG. 11;

the signal processing unit (8) of FIG. 11;

the tuning control unit (4) of FIG. 11; and a radio device (5) which consists of all parts of the transmitter (or transceiver) which are not shown elsewhere in FIG. 12, the radio device having m=2 radio ports, the radio device delivering the configuration instruction, the radio device delivering "tuning sequence instructions" which indicate when a tuning sequence is being performed, m excitations being delivered by the radio ports during said tuning sequence, one and only one of the excitations being delivered by each of the radio ports.

In FIG. 12, each of the input ports of the multiple-input-port and multiple-output-port tuning unit (6) is coupled to one and only one of the radio ports, through one and only one of the sensing units. The m radio ports see, at the given frequency, an impedance matrix referred to as "the impedance matrix seen by the radio ports", which clearly may be considered as being the impedance matrix presented by the user ports and denoted by $Z_U$.

The radio device (5) performs functions which were, in the explanations provided above about FIG. 11, assigned to the external device. The configuration instruction is delivered to the switching unit (7). The tuning sequence instructions are delivered to the signal processing unit (8). Additionally, the radio device provides other signals to the signal processing unit, and/or receives other signals from the signal processing unit.

This thirteenth embodiment may possibly use some aspects of the technique disclosed in the French patent application No. 14/01221 of 28 May 2014, entitled "Communication radio utilisant une pluralité d'antennes sélectionnées", corresponding to the international application No. PCT/IB2015/052974 of 23 Apr. 2015, entitled "Radio communication using a plurality of selected antennas".

INDICATIONS ON INDUSTRIAL APPLICATIONS

The method of the invention is suitable for optimally and automatically adjusting a plurality of tunable passive antennas, and the automatically tunable antenna array of the invention can optimally and automatically adjust its tunable passive antennas.

The automatically tunable antenna array of the invention may for instance be a part of a radio transmitter using a plurality of antennas simultaneously, or of a radio transceiver using a plurality of antennas simultaneously. In such applications, each user port of the automatically tunable antenna array of the invention may be coupled to one of the radio-frequency signal output ports of the radio transmitter using a plurality of antennas simultaneously, or to one of the radio-frequency signal input/output ports of the radio transceiver using a plurality of antennas simultaneously. Thus, the method and the automatically tunable antenna array of the invention are suitable for MIMO radio communication.

The method and the automatically tunable antenna array of the invention provide the best possible characteristics using very close tunable passive antennas, hence presenting a strong interaction between them. The invention is therefore particularly suitable for mobile radio transmitters and transceivers, for instance those used in portable radiotelephones or portable computers.

The method and the automatically tunable antenna array of the invention provide the best possible characteristics using a very large number of tunable passive antennas in a given volume, hence presenting a strong interaction between them. The invention is therefore particularly suitable for high-performance radio transmitters and transceivers, for instance those used in the fixed stations of cellular radiotelephony networks.

The invention claimed is:

1. A method for automatically adjusting n tunable passive antennas, where n is an integer greater than or equal to 2, each of then tunable passive antennas comprising at least one antenna control device, one or more characteristics of said each of the n tunable passive antennas being controlled using said at least one antenna control device, said at least one antenna control device having at least one parameter having an influence on said one or more characteristics, said at least one parameter being adjustable by electrical means, the method comprising the steps of:

applying excitations to m user ports, where m is an integer greater than or equal to 2, one and only one of the excitations being applied to each of the user ports, each of the excitations having one and only one complex envelope, the m complex envelopes of them excitations being linearly independent in the set of complex functions of one real variable, regarded as a vector space over the field of complex numbers, the m user ports presenting, at a given frequency, an impedance matrix referred to as the impedance matrix presented by the user ports;

estimating q real quantities depending on the impedance matrix presented by the user ports, where q is an integer greater than or equal to m, by utilizing the m excitations;

utilizing the q real quantities depending on the impedance matrix presented by the user ports, to obtain tuning control signals; and applying each of the tuning control signals to one or more of the antenna control devices, each of said parameters being mainly determined by one or more of the tuning control signals.

2. The method of claim 1, wherein two or more of the excitations are applied simultaneously to the user ports.

3. An automatically tunable antenna array having m user ports, where m is an integer greater than or equal to 2, the m user ports presenting, at a given frequency, an impedance matrix referred to as the impedance matrix presented by the user ports, the automatically tunable antenna array comprising:

n tunable passive antennas, where n is an integer greater than or equal to 2, each of the n tunable passive antennas comprising at least one antenna control device, one or more characteristics of said each of the n tunable passive antennas being controlled using said at least one antenna control device, said at least one antenna control device having at least one parameter having an influence on said one or more characteristics, said at least one parameter being adjustable by electrical means;

at least m sensing units, each of the sensing units delivering one or more sensing unit output signals, each of the sensing unit output signals being mainly determined by one or more electrical variables;

a signal processing unit, the signal processing unit estimating q real quantities depending on the impedance matrix presented by the user ports, where q is an integer greater than or equal to m, by utilizing the sensing unit output signals obtained for m excitations applied to the user ports, one and only one of the excitations being applied to each of the user ports, each of the excitations having one and only one complex envelope, the m complex envelopes of the m excitations being linearly independent in the set of complex functions of one real variable, regarded as a vector space over the field of complex numbers, the signal processing unit delivering a tuning instruction as a function of the q real quantities depending on the impedance matrix presented by the user ports; and a tuning control unit, the tuning control unit receiving the tuning instruction from the signal processing unit, the tuning control unit delivering tuning control signals to the tunable passive antennas, the tuning control signals being determined as a function of the tuning instruction, each of said parameters being mainly determined by one or more of the tuning control signals.

4. The automatically tunable antenna array of claim 3, wherein the sensing unit output signals delivered by each of the sensing units comprise: a first sensing unit output signal proportional to a first electrical variable, the first electrical variable being a voltage across one of the user ports; and a second sensing unit output signal proportional to a second electrical variable, the second electrical variable being a current flowing in said one of the user ports.

5. The automatically tunable antenna array of claim 3, wherein the sensing unit output signals delivered by each of the sensing units comprise: a first sensing unit output signal proportional to a first electrical variable, the first electrical variable being an incident voltage at one of the user ports; and a second sensing unit output signal proportional to a second electrical variable, the second electrical variable being a reflected voltage at said one of the user ports.

6. The automatically tunable antenna array of claim 3, further comprising n feeders, each of the feeders having a first end coupled to a signal port of one and only one of the tunable passive antennas, each of the feeders having a second end coupled to one and only one of the user ports, through one and only one of the sensing units.

7. The automatically tunable antenna array of claim 3, further comprising a multiple-input-port and multiple-output-port network having m input ports, each of the m input ports being coupled to one and only one of the user ports, through one and only one of the sensing units.

8. The automatically tunable antenna array of claim 7, wherein the multiple-input-port and multiple-output-port network is not composed of a plurality of uncoupled single-input-port and single-output-port networks.

9. The automatically tunable antenna array of claim 7, wherein the multiple-input-port and multiple-output-port network is composed of m uncoupled single-input-port and single-output-port networks.

10. The automatically tunable antenna array of claim 3, further comprising a multiple-input-port and multiple-output-port tuning unit having m input ports, each of the m input ports being coupled to one and only one of the user ports through one and only one of the sensing units, the multiple-input-port and multiple-output-port tuning unit comprising p adjustable impedance devices, where p is an integer greater than or equal to m, the p adjustable impedance devices being referred to as the adjustable impedance devices of the tuning unit and being such that, at said given frequency, each of the adjustable impedance devices of the tuning unit has a reactance, the reactance of any one of the adjustable impedance devices of the tuning unit being adjustable by electrical means, the automatically tunable antenna array being such that the tuning control unit delivers tuning control signals to the multiple-input-port and multiple-output-port tuning unit, the reactance of each of the adjustable impedance devices of the tuning unit being mainly determined by one or more of the tuning control signals.

11. The automatically tunable antenna array of claim 10, wherein the multiple-input-port and multiple-output-port tuning unit has a plurality of output ports and is such that, at the given frequency, there exists a diagonal impedance matrix referred to as the given diagonal impedance matrix, the given diagonal impedance matrix being such that, if an impedance matrix seen by the output ports is equal to the given diagonal impedance matrix, then the reactance of any one of the adjustable impedance devices of the tuning unit has an influence on an impedance matrix presented by the input ports.

12. The automatically tunable antenna array of claim 11, wherein the multiple-input-port and multiple-output-port tuning unit is such that, at the given frequency, if an impedance matrix seen by the output ports is equal to the given diagonal impedance matrix, then the reactance of at least one of the adjustable impedance devices of the tuning unit has an influence on at least one non-diagonal entry of the impedance matrix presented by the input ports.

13. The automatically tunable antenna array of claim 10, wherein the multiple-input-port and multiple-output-port tuning unit is composed of m uncoupled single-input-port and single-output-port tuning units, each comprising one or more of said adjustable impedance devices of the tuning unit.

14. The automatically tunable antenna array of claim 3, wherein two or more of the excitations are applied simultaneously to the user ports.

15. The automatically tunable antenna array of claim 3, wherein the tuning instruction is such that the impedance matrix presented by the user ports is substantially equal to a wanted impedance matrix.

16. The automatically tunable antenna array of claim 3, wherein the signal processing unit uses a lookup table to determine the tuning instruction.

17. The automatically tunable antenna array of claim 3, wherein the signal processing unit delivers the tuning instruction as a function of said q real quantities depending on the impedance matrix presented by the user ports, and as a function of one or more temperatures.

18. The automatically tunable antenna array of claim 3, wherein the tuning control signals are determined as a function of the tuning instruction and as a function of one or more temperatures.

19. The automatically tunable antenna array of claim 3, wherein the tuning instruction is delivered repeatedly.

* * * * *